US012769390B2

(12) United States Patent
Buerkle et al.

(10) Patent No.: US 12,769,390 B2
(45) Date of Patent: Oct. 20, 2026

(54) CONTROL DEVICE AND METHOD FOR CONTROLLING A DISPLAY UNIT IN A VEHICLE

(71) Applicant: Intel Corporation, Santa Clara, CA (US)

(72) Inventors: Cornelius Buerkle, Karlsruhe (DE); Fabian Oboril, Karlsruhe (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 18/959,683

(22) Filed: Nov. 26, 2024

(65) Prior Publication Data

US 2025/0216932 A1 Jul. 3, 2025

(30) Foreign Application Priority Data

Dec. 28, 2023 (DE) ..................... 10 2023 136 753.6

(51) Int. Cl.
*G06F 3/01* (2006.01)
*G09G 3/00* (2006.01)

(52) U.S. Cl.
CPC .............. *G06F 3/012* (2013.01); *G06F 3/013* (2013.01); *G09G 3/001* (2013.01); *G09G 2340/0464* (2013.01); *G09G 2340/12* (2013.01); *G09G 2354/00* (2013.01); *G09G 2380/10* (2013.01)

(58) Field of Classification Search
CPC ......... G06F 3/012; G06F 3/013; G09G 3/001; G09G 2340/0464; G09G 2340/12; G09G 2354/00; G09G 2380/10
See application file for complete search history.

(56) References Cited

U.S. PATENT DOCUMENTS

| | | | | |
|---|---|---|---|---|
| 6,279,017 | B1 * | 8/2001 | Walker | G09B 17/04 715/201 |
| 10,948,299 | B1 * | 3/2021 | Zhang | G01C 21/165 |
| 2004/0066376 | A1 * | 4/2004 | Donath | G01C 21/365 345/169 |
| 2004/0100419 | A1 * | 5/2004 | Kato | G09G 5/00 345/7 |
| 2008/0199167 | A1 * | 8/2008 | Daly | G06T 5/80 396/72 |

(Continued)

*Primary Examiner* — Mihir K Rayan

(74) *Attorney, Agent, or Firm* — VIERING, JENTSCHURA & PARTNER mbB

(57) ABSTRACT

A control device and a method for controlling a display unit arranged in a vehicle, such that the control device comprises a processor configured to receive first data representing an environment of a vehicle; determine a driving trajectory of the vehicle using the first data; receive second sensor data representing a head movement of an occupant of the vehicle; determine a time-dependent relative movement between the head movement of the occupant and a vehicle movement according to the driving trajectory using a speed of the vehicle; determine a time-dependent change in a position of display information to be displayed on a display unit disposed in the vehicle such that the change in the position of the display information compensates for all or part of the relative movement; and generate control instructions for controlling the display unit to display the display information in accordance with the time-dependent change in the position.

20 Claims, 11 Drawing Sheets

(56) References Cited

U.S. PATENT DOCUMENTS

| | | | | |
|---|---|---|---|---|
| 2009/0179987 | A1* | 7/2009 | Kim | G06F 3/011<br>345/619 |
| 2013/0021373 | A1* | 1/2013 | Vaught | G06F 3/013<br>345/633 |
| 2014/0111550 | A1* | 4/2014 | Abraham | G09G 5/00<br>345/660 |
| 2016/0154538 | A1* | 6/2016 | Wang | G01C 21/3664<br>715/771 |
| 2018/0061103 | A1* | 3/2018 | Zhu | G06F 3/012 |
| 2018/0081426 | A1* | 3/2018 | Rothkopf | G06F 3/012 |
| 2023/0029533 | A1* | 2/2023 | Kim | B60W 50/14 |

* cited by examiner

CONTROL DEVICE AND METHOD FOR CONTROLLING A DISPLAY UNIT IN A VEHICLE

CROSS-REFERENCE TO RELATED APPLICATIONS

This non-provisional application claims foreign priority to German Application DE 102023136753.6, which was filed on Dec. 28, 2023, the entire content of which is incorporated herein by reference.

TECHNICAL AREA

Various aspects of the present disclosure relate generally to a control device and method for controlling a display unit arranged in a vehicle.

BACKGROUND

When occupants (e.g. a driver, a passenger, a passenger) moves in a vehicle, they are subject to vertical, longitudinal, lateral and rotational movements as a result of the vehicle movement. For various applications, it can be advantageous to show display information, such as a text and/or a video, for the occupant in a world-fixed manner on a display unit. A world-fixed display of the display information for the occupant can be independent of the vehicle movement.

BRIEF DESCRIPTION OF THE REVELATION

According to various embodiments, a control device and a method for controlling a display unit arranged in a vehicle are provided, which enable such a world-fixed display of display information for an occupant in a vehicle. According to various aspects, a position of the display information on the display unit is changed in time such that a relative movement between a movement of the vehicle and a head movement of the occupant is reduced, minimized or even compensated.

BRIEF DESCRIPTION OF THE FIGURES

In the drawings, reference signs in the various views generally refer to the same parts. The drawings are not necessarily to scale, instead a general emphasis is placed on illustrating the principles of the invention. In the following description, various embodiments of the invention are described with reference to the following drawings, in which.

DETAILED DESCRIPTION

Figure 1:
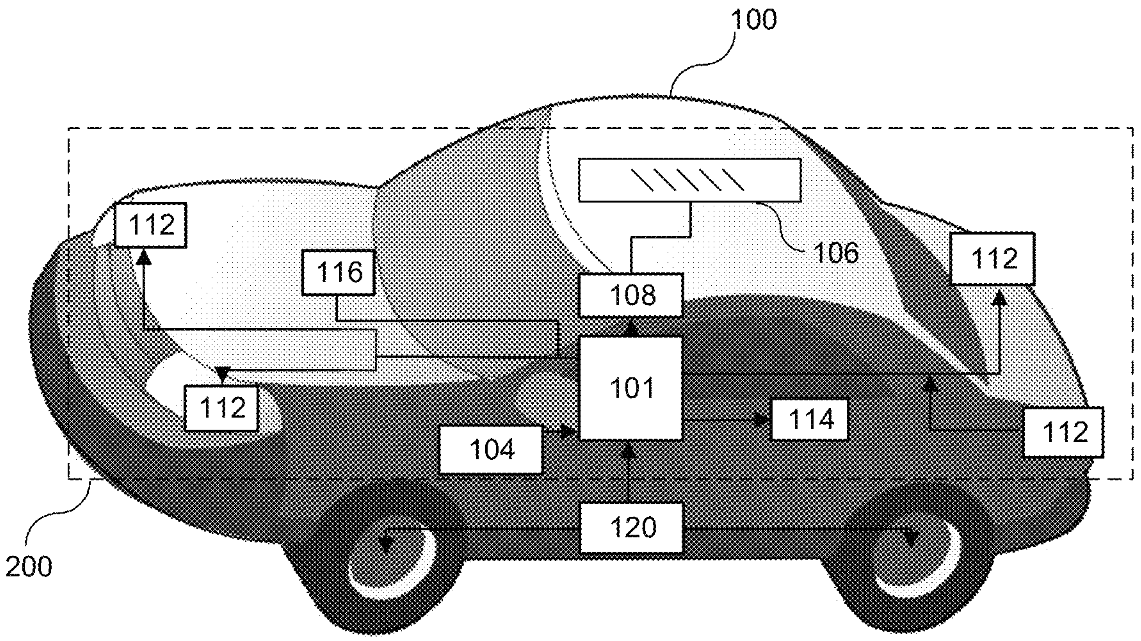
FIG. 1 shows a vehicle according to various aspects.

The following detailed description refers to the accompanying drawings, which show specific details and embodiments in which the invention may be practiced for illustrative purposes.

The word "exemplary" is used herein to mean "serving as an example, case or illustration". Any embodiment described herein as "exemplary" is not necessarily to be considered preferred or advantageous over other embodiments.

The terms "at least one" and "one or more" may be understood to have a numerical quantity greater than or equal to one (e.g., one, two, three, four, [ . . . ], etc.). The term "a plurality" can be understood as having a numerical quantity greater than or equal to two (e.g. two, three, four, five, [ . . . ] etc.).

The terms "several" and "plurality" expressly refer to a quantity greater than one. Accordingly, all expressions expressly referring to the aforementioned words (e.g., a plurality of elements, multiple elements) refer to a set of elements, expressly referring to more than one of those elements. The expressions "group (of)", "set (of)", "collection (of)", "series (of)", "sequence (of)", "grouping (of)", etc. and similar expressions in the description and in the claims refer to a set equal to or greater than one, i.e. one or more.

The term "at least one of" with respect to a group of elements may be used herein to mean at least one element from the group including the elements. For example, the term "at least one of" with respect to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., in the form of a file, a portion of a file, a set of files, a signal or stream, a portion of a signal or stream, a set of signals or streams, and the like. In addition, the term "data" may also be used to refer to information, for example in the form of a pointer. However, the term "data" is not limited to the aforementioned examples and may take various forms and represent any information as understood in the art.

The term "processor" as used herein may be understood as any type of entity that allows the processing of data or signals. For example, the data or signals may be handled according to at least one (i.e., one or more than one) specific function performed by the processor. A processor may include or be formed from an analog circuit, a digital circuit, a mixed signal circuit, a logic circuit, a microprocessor, a central processing unit (CPU), a graphics processing unit (GPU), a digital signal processor (DSP), a programmable gate array (FPGA), an integrated circuit, or any combination thereof. Any other type of implementation of the respective functions described in more detail below may also be understood as a processor or logic circuit. It will be understood that one or more of the method steps described in detail herein may be performed (e.g., realized) by a processor, through one or more specific functions performed by the processor. The processor may therefore be configured to perform one of the methods or information processing components thereof described herein.

Differences between software- and hardware-implemented data processing may become blurred. A processor, a security system, a computing system and/or other aspects described herein may be realized in software, hardware and/or as a hybrid implementation with both software and hardware.

The term "memory" is understood here as a computer-readable medium in which data or information can be stored for retrieval. A memory used in the embodiments may be a volatile memory, for example a DRAM (dynamic random access memory), or a non-volatile memory, for example a PROM (programmable read-only memory), an EPROM (erasable PROM), an EEPROM (electrically erasable PROM) or a flash memory, such as a floating gate memory device, a charge intercepting memory device, an MRAM (magnetoresistive random access memory) or a PCRAM (phase change random access memory). A memory can be a flash memory, a solid state memory, a magnetic tape, a hard disk drive, an optical drive, etc., or any combination thereof. Registers, shift registers, processor registers, data buffers, etc. also fall under the term "memory". The term "software" refers to all types of executable instructions, including firmware.

The term "system" (e.g., a computing system, an automated driving system, a safety system, etc.) discussed in more detail herein may be understood as a set of interacting elements, wherein the elements may be, by way of example and not limitation, one or more mechanical components, one or more electrical components, one or more instructions (e.g., encoded in storage media), and/or one or more processors, and the like.

Unless explicitly stated, the term "transmit" includes both direct (point-to-point) and indirect transmission (via one or more intermediate points). Similarly, the term "receive" includes both direct and indirect reception. In addition, the terms "transmit", "receive", "communicate" and similar terms indicate both physical transmission (e.g., the transmission of radio signals) and logical transmission (e.g., the transmission of digital data via a logical connection at the software level). For example, a processor or control device may transmit or receive data via a software-level link with another processor or control device in the form of radio signals, with the physical transmission and reception being handled by radio layer components such as RF transceivers and antennas, and the logical transmission and reception being handled by the processors or control devices via the software-level link. The term "communicate" includes both transmission and reception, i.e. unidirectional or bidirectional communication in one or both directions, i.e. inbound and outbound.

The term "calculate" includes both "direct" calculations using a mathematical expression/formula/relationship and "indirect" calculations using lookup or hash tables and other array indexing or search operations.

A "vehicle" can be any type of powered or drivable object. For example, a vehicle may be a powered object with an internal combustion engine, a reaction engine, an electrically powered object, a hybrid powered object, or a combination thereof. A vehicle may be or include an automobile, a bus, a minibus, a van, a truck, a camper, a vehicle trailer, a motorcycle, a bicycle, a tricycle, a train locomotive, a train car, a moving robot, a passenger transporter, a boat, a ship, a submersible, a submarine, a drone, an airplane, a rocket and the like.

According to various aspects, the vehicle can be a ground traveling vehicle. A "ground moving vehicle" (also referred to as a ground vehicle) may be understood to be any type of vehicle, as described above, configured to move or be driven on the ground, e.g., on a road, a path, a track, one or more rails, off-road, etc. An "aerial vehicle" may be understood to be any type of vehicle, as described above, that is capable of maneuvering above the ground for any period of time, e.g., a drone. Similar to how a ground vehicle is equipped with wheels, belts, etc. to move on the ground, an "aerial vehicle" may have one or more propellers, wings, fans, etc. to be able to maneuver in the air. A "water vehicle" may be understood to be any type of vehicle, as described above, that can be maneuvered on or under the surface of a liquid, e.g., a boat on the surface of the water or a submarine under the surface of the water. It is understood that some vehicles may be configured to operate as ground, air and/or water vehicles.

The term "at least partially automated vehicle" may describe a vehicle that is capable of making at least one navigation change without driver input. A navigation change may describe or include a change in the steering, braking or acceleration/deceleration of the vehicle. A vehicle can be described as autonomous if it is fully automated (e.g. fully functional without driver input). Partially automated vehicles may include vehicles that can operate under driver control during certain periods and without driver control during other periods. At least partially automated vehicles may also include vehicles that control only some aspects of vehicle navigation, such as steering (e.g., to maintain a vehicle heading between lane boundaries) or some steering under certain circumstances (but not all circumstances), but leave other aspects of vehicle navigation to the driver (e.g., braking or braking under certain circumstances). At least partially automated vehicles may also include vehicles that share control of one or more aspects of vehicle navigation in certain circumstances (e.g., "hands-on", i.e., in response to driver input), and vehicles that control one or more aspects of vehicle navigation in certain circumstances (e.g., "hands-off", i.e., independent of driver input). The at least partially automated vehicles may also include vehicles that control one or more aspects of vehicle navigation under certain circumstances, e.g., under certain environmental conditions (e.g., spatial areas, roadway conditions). In various aspects, at least partially automated vehicles may perform some or all aspects of braking, speed control, rate control, and/or steering of the vehicle. Autonomous vehicles may include those that can drive without a driver. The level of automation of a vehicle may be described or determined by the Society of Automotive Engineers (SAE) level of automation (e.g., as defined by the SAE, e.g., in SAE J3016 2018: Taxonomy and definitions for terms related to driving automation systems for on road motor vehicles) or by other relevant professional organizations. The SAE level may have a value ranging from a minimum level, e.g. level 0 (for illustration: essentially no driving automation), to a maximum level, e.g. level 5 (for illustration: full driving automation). Therefore, an at least partially automated vehicle may be an automated vehicle or an autonomous vehicle. For example, the at least partially automated vehicle may be a partially automated vehicle (according to level 2), a highly automated vehicle (according to level 3), a fully automated vehicle (according to level 4) or an autonomous vehicle (according to level 5).

A model (e.g. a model based on machine learning (also referred to as a machine learning model)) may be, for example, a reinforcement learning model (e.g. using Q-learning, Temporal Difference (TD), Deep Adversarial Networks, etc.) and/or a classification model (e.g. a linear classifier (e.g. a logistic regression classifier or a Naive Bayes classifier), a support vector machine, a decision tree, a boosted tree classifier, a random forest classifier, a neural network or a nearest neighbor model). A neural network can be or include any type of neural network, such as a convolutional neural network, (CNN), a variational autoencoder network, (VAE), a sparse autoencoder network, (SAE), a recurrent neural network (RNN), a deconvolutional neural network (DNN), a generative adversarial network (GAN), a forward-thinking neural network, a sum-product neural network, a transformer-based network, etc.

A "control device" as used herein can be understood as any type of entity (e.g., implementing logic) that allows processing of data or signals. For example, the control device may include one or more than one processor capable of executing software stored in a memory device (also referred to as a storage medium in some aspects), firmware, or a combination thereof, and issuing instructions based thereon. For example, the control device may be configured using code segments (e.g., software) to control the operation of a system. For example, the data or signals may, for example, be handled according to at least one (i.e. one or more than one) specific function performed by the processor.

The term "image" as used herein may be any type of digital image data that may represent a pictorial representation, such as a digital RGB image, a digital RGB-D image, a binary image, a 3D image, a point cloud, a time series, a semantic segmentation image, etc.

The expression that an element, a parameter, etc. "represents" another element, another parameter, etc. can be understood to mean that these are linked to each other, e.g. the element and/or the parameter is a (e.g. unique, e.g. one-to-one) function of the other element and/or parameter.

FIG. 1 illustrates a vehicle 100 having a mobility system 120 and a control system 200 (see also FIG. 2) according to various aspects. It will be understood that the vehicle 100 and control system 200 are exemplary and therefore may be simplified for explanatory purposes. For example, while the vehicle 100 is shown as a ground vehicle, aspects of the present disclosure may be equally or analogously applied to aircraft, such as drones, or watercraft, such as boats. Furthermore, the quantities and positions of the elements and the relative distances (as described above, the figures are not to scale) are shown as examples and are not limited thereto. The components of the vehicle 100 may be arranged around a vehicle housing of the vehicle 100, mounted on or outside the vehicle housing, enclosed within the vehicle housing, or in some other arrangement relative to the vehicle housing in which the components move with the moving vehicle 100. For example, the vehicle body may be a car body, a drone body, an airplane or helicopter hull, a boat hull, or a similar type of vehicle body, depending on the type of vehicle 100.

The control system 200 may include a control device 101. The control device 101 may include one or more than one processor 102. Where reference is made herein to processing by the control device 101, such processing may be performed by one or more than one processor of the one or more processors 102.

In addition to a control system 200, the vehicle 100 may also include a mobility system 120. The mobility system 120 may include components of the vehicle 100 related to steering and movement of the vehicle 100. For example, in some instances where the vehicle 100 is an automobile, the mobility system 120 may include wheels and axles, a suspension, an engine, a transmission, brakes, a steering wheel, associated electrical circuitry and wiring, and any other components used in the propulsion of an automobile. In some instances where the vehicle 100 is an aircraft, the mobility system 120 may include one or more rotors, propellers, jet engines, wings, rudders or wing flaps, air brakes, a yoke or cycle, associated electrical circuits and wiring, and any other components used in flying an aircraft. In some instances where the vehicle 100 is a watercraft or submersible, the mobility system 120 may include one or more of the following: Rudders, motors, propellers, a steering wheel, associated electrical circuitry and wiring, and any other components used to control or move a watercraft. In various aspects, the mobility system 120 may also include autonomous driving functionality and, accordingly, may include an interface with one or more processors 102 configured to perform autonomous driving calculations and decisions and a set of sensors for motion and obstacle detection. In this sense, the mobility system 120 may be provided with instructions for controlling navigation and/or mobility of the vehicle 100 from one or more components of the control system 200. The at least partially automated driving components of the mobility system 120 may also be connected to one or more radio frequency (RF) transceivers 108 to facilitate mobility coordination with other nearby vehicle communication devices and/or centralized network components that perform decisions and/or computations related to autonomous driving.

Figure 2:
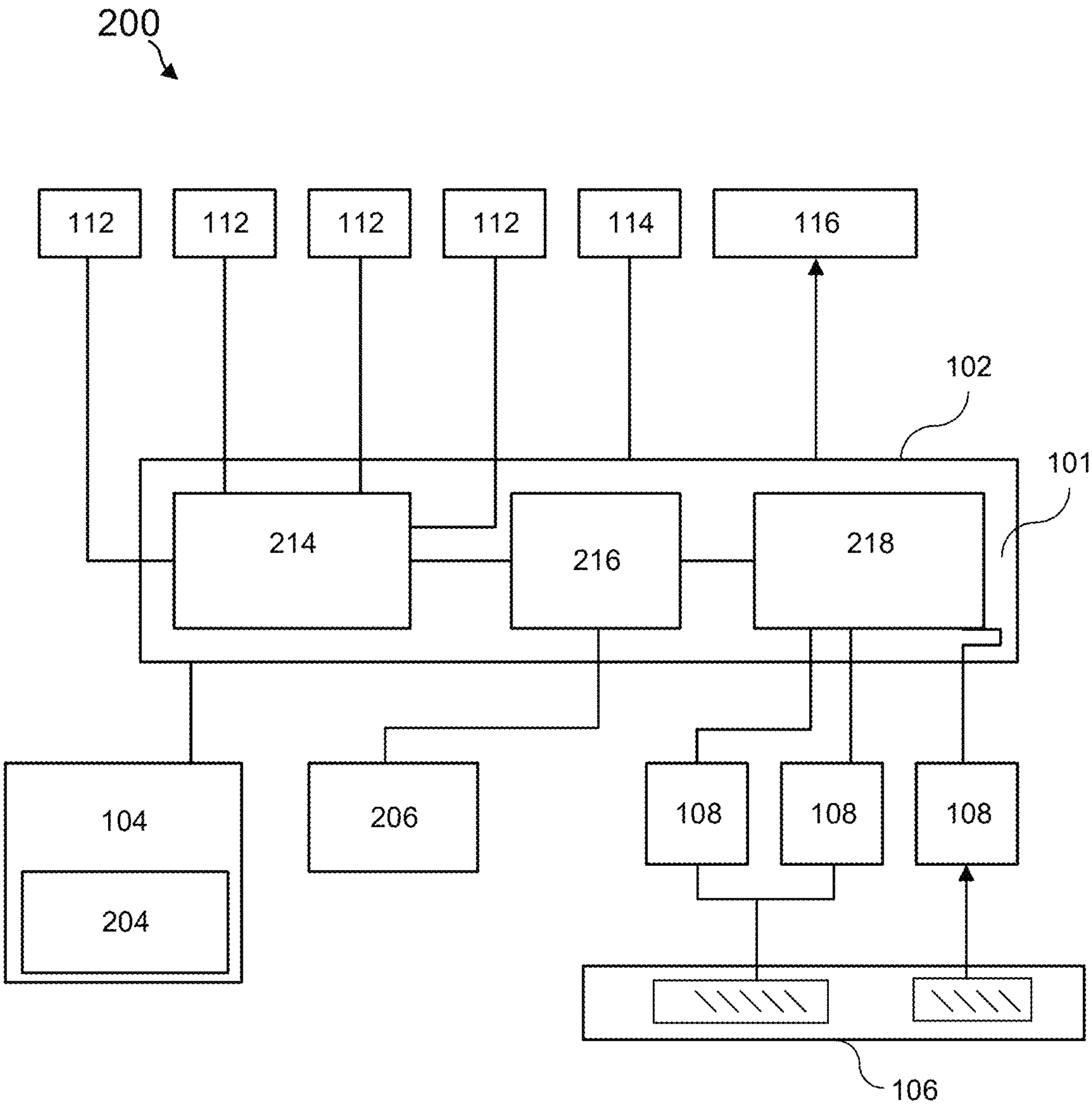
FIG. 2 shows various electronic components of the vehicle.

The control system 200 may have different components depending on the requirements of a particular implementation. As shown in FIG. 1 and FIG. 2 the control system 200 may include one or more processors 102, one or more memory devices (e.g., one or more memories) 104, an antenna system 106, which may include one or more antenna arrays at various locations on the vehicle for radio frequency coverage, one or more radio frequency transmitter/receivers 108, one or more data acquisition devices 112, one or more positioning devices 114, which may include components and circuitry for receiving and determining a position based on a global navigation satellite system (GNSS) and/or a global positioning system (GPS), and one or more measurement sensors 116, e.g., speedometers, altimeters, and altitude sensors 116. e.g. speedometer, altimeter, gyroscope, velocity sensors, etc.

The control system 200 may be configured to control the mobility of the vehicle 100 via the mobility system 120 and/or interaction with its environment, such as communication with other devices or network infrastructure elements (NIEs) such as base stations, via the data collection devices 112 and the radio frequency communication arrangement including the one or more RF transceivers 108 and the antenna system 106.

The one or more processors 102 may include a data acquisition processor 214, an application processor 216, a communication processor 218, and/or any other suitable processing device. Each processor 214, 216, 218 of the one or more processors 102 may include various types of hardware-based processing devices. For example, each processor 214, 216, 218 may include a microprocessor, preprocessors (e.g., an image preprocessor), graphics processors, a central processing unit (CPU), support circuitry, digital signal processors, integrated circuits, memory, or other types of devices suitable for executing applications and performing image processing and analysis. In various aspects, each processor 214, 216, 218 can include any type of single-core or multi-core processor, mobile device microcontroller, central processing unit, etc. These types of processors may each have multiple processing units with local memory and instruction sets. Such processors may have video inputs for receiving image data from multiple image sensors and may also have video output functions.

Each of the processors 214, 216, 218 may be configured to perform certain functions according to program instructions that may be stored in a memory of the one or more memories 104. In other words, a memory of the one or more memories 104 may store software that, when executed by a processor (e.g., the one or more processors 102), controls operation of the system, such as a driving and/or safety system. A memory of the one or more memories 104 may store one or more databases and image processing software and a trained system, such as a neural network or deep neural network. The one or more memories 104 may include any number of random access memories, read-only memories, flash memories, hard disk drives, optical memories, tape memories, removable memories, and other types of memories. Alternatively, each of the processors 214, 216, 218 may include an internal memory for such storage.

The data capture processor 216 may include processing circuitry, such as a CPU, for processing data captured by the data capture devices 112. For example, if one or more data acquisition devices are image acquisition units, such as one or more cameras, then the data acquisition processor may include image processors for processing image data using the information received from the image acquisition units as input. The data acquisition processor 216 may be configured to create voxel maps detailing the environment of the vehicle 100 based on the data input from the data acquisition devices 112, e.g., the cameras.

Various aspects relate to first sensor data representing an environment of the vehicle 100 (at least in the direction of travel). This first sensor data may include sensor data provided by one or more of the data acquisition devices 112.

The application processor 216 may be a CPU and may be configured to process the layers above the protocol stack, including the transport and application layers. The application processor 216 may be configured to execute various applications and/or programs of the vehicle 100 at an application layer of the vehicle 100, such as an operating system (OS), a user interface (UI) 206 to support user interaction with the vehicle 100, and/or various user applications. The application processor 216 may interface with the communication processor 218 and act as a source (in the transmit path) and sink (in the receive path) for user data such as voice data, audio/video/image data, message data, application data, basic internet/web access data, etc. In the transmit path, the communication processor 218 may therefore receive and process outgoing data provided by the application processor 216 according to the layer-specific functions of the protocol stack and provide the resulting data to the digital signal processor 208. The communication processor 218 may then process the received data at the physical layer to generate digital baseband samples, which the digital signal processor may forward to the RF transceiver(s) 108. The RF transceiver(s) 108 may then process the digital baseband samples to convert the digital baseband samples into analog RF signals, which the RF transceiver(s) 108 may transmit wirelessly via the antenna system 106. In the receive path, the RF transceiver(s) 108 may receive analog RF signals from the antenna system 106 and process the analog RF signals to obtain digital baseband samples. RF transceiver(s) 108 may forward the digital baseband samples to communications processor 218, which processes the digital baseband samples at the physical layer. The communication processor 218 may then pass the resulting data to other processors of the one or more processors 102, which may process the resulting data according to the layer-specific functions of the protocol stack and pass the resulting incoming data to the application processor 216. The application processor 216 may then process the incoming data at the application layer, which may include executing one or more application programs with the data and/or presenting the data to a user via one or more user interfaces 206. The user interfaces 206 may include one or more screens, microphones, mice, touchpads, keyboards, or any other interface that provides a mechanism for user input.

The communication processor 218 may include a digital signal processor and/or a control device that may control a communication functionality of the vehicle 100 according to communication protocols associated with one or more radio access networks, and that may perform control of the antenna system 106 and RF transceiver(s) 108 to transmit and receive radio signals according to formatting and scheduling parameters defined by each communication protocol. Although various practical embodiments may have separate communication components for each supported radio communication technology (e.g., a separate antenna, RF transmitter/receiver, digital signal processor, and control device), the configuration of vehicle 100 shown in FIGS. 1 and 2 may represent only one component for clarity. The configuration of the vehicle 100 shown in FIGS. 1 and 2 is only a single example of such components.

The vehicle 100 may transmit and receive wireless signals using the antenna system 106, which may be a single antenna or an antenna array with multiple antenna elements. In various aspects, the antenna system 202 may further include analog antenna combinations and/or beamforming circuits. In the receive (RX) path, RF transceiver(s) 108 may receive analog radio frequency signals from antenna system 106 and perform analog and digital RF front-end processing of the analog radio frequency signals to generate digital baseband samples (e.g., in-phase/quadrature (IQ) samples) that are provided to communication processor 218. RF transceivers 108 may have analog and digital receiving components, including amplifiers (e.g., low noise amplifiers (LNAs)), filters, RF demodulators (e.g., RF IQ demodulators), and analog-to-digital converters (ADCs), which RF transceivers 108 may use to convert the received radio frequency signals into digital baseband samples. In the transmit (TX) path, RF transceiver(s) 108 may receive digital baseband samples from communication processor 218 and perform analog and digital RF front-end processing on the digital baseband samples to generate analog radio frequency signals that are provided to antenna system 106 for wireless transmission. RF transceivers 108 may therefore have analog and digital transmission components, including amplifiers (e.g., power amplifiers (PAS), filters, RF modulators (e.g., RF IQ modulators), and digital-to-analog converters (DACs), which RF transceivers 108 may use to mix the digital baseband samples received from the communications processor 218 to generate the analog radio frequency signals for wireless transmission by the antenna system 106. In various aspects, the communication processor 218 may control the radio transmission and reception of the RF transceiver(s) 108, including determining the transmit and receive radio frequencies for operation of the RF transceiver (s) 108.

According to various aspects, the communication processor 218 may include a baseband modem configured to perform physical layer (PHY, layer 1) transmit and receive processing to prepare outgoing transmit data in the transmit path, provided by the communication processor 218, for transmission via the RF transmitter(s)/receiver(s) 108, and to prepare incoming received data in the receive path, provided by the RF transmitter(s)/receiver(s) 108, for processing by the communication processor 218. The baseband modem may include a digital signal processor and/or a controller. The digital signal processor may be configured to perform one or more of the following functions: Error detection, forward error correction encoding/decoding, channel encoding and interleaving, channel modulation/demodulation, physical channel mapping, radio measurement and search, frequency and time synchronization, antenna diversity processing, power control and weighting, rate adaptation, retransmission processing, interference cancellation, and other physical layer processing functions. The digital signal processor may be structurally implemented as hardware components (e.g., as one or more digitally configured hardware circuits or FPGAs), as software-defined components (e.g., one or more processors configured to execute program code defining arithmetic, control, and I/O instructions (e.g., software and/or firmware) stored in a non-transitory computer-readable storage medium), or as a combination of hardware and software components. In various aspects, the digital signal processor can include one or more processors configured to retrieve and execute program code defining control and processing logic for physical layer processing operations. In various aspects, the digital signal processor can perform processing functions with software via execution of executable instructions. In various aspects, the digital signal processor can include one or more dedicated hardware circuits (e.g., ASICs, FPGAs, and other hardware) that are digitally configured to perform specific processing functions, wherein the one or more processors of the digital signal processor can offload certain processing tasks to these dedicated hardware circuits, known as hardware accelerators. Exemplary hardware accelerators may include Fast Fourier Transform (FFT) circuits and encoder/decoder circuits. In various aspects, the processor and hardware acceleration components of the digital signal processor may be implemented as a coupled integrated circuit.

The vehicle 100 may be configured to operate with one or more radio communication technologies. The digital signal processor of the communication processor 218 may be responsible for the lower layer (e.g., layer 1/PHY) processing functions of the radio communication technologies, while a controller of the communication processor 218 may be responsible for the upper layer (e.g., data link layer/layer 2 and/or network layer/layer 3) protocol stack functions. The controller device may thus be responsible for controlling the radio communication components of the vehicle 100 (antenna system 106, RF transceiver(s) 108, positioning device 114, etc.) in accordance with the communication protocols of each supported radio communication technology, and may accordingly represent the access stratum and non-access stratum (NAS) (which also includes layer 2 and layer 3) of each supported radio communication technology. The control device may be structurally implemented as a protocol processor configured to execute protocol stack software (retrieved from a memory of the control device) and subsequently control the radio communication components of the vehicle 100 to transmit and receive communication signals in accordance with the corresponding protocol stack control logic defined in the protocol stack software. The control device may include one or more processors configured to retrieve and execute program code defining upper layer protocol stack logic for one or more radio communication technologies, which may include data link layer/layer 2 and network layer/layer 3 functions. The control device may be configured to perform both user layer and control layer functions to facilitate the transmission of application layer data to and from the vehicle 100 according to the specific protocols of the supported radio communication technology. User plane functions may include header compression and encapsulation, security, error checking and correction, channel multiplexing, scheduling and priority, while control plane functions may include radio bearer setup and maintenance. The program code accessed and executed by the controller of the communication processor 218 may include executable instructions defining the logic of such functions.

In various aspects, the vehicle 100 may be configured to transmit and receive data according to multiple radio communication technologies. Accordingly, in various aspects, one or more of antenna system(s) 106, RF transceiver(s) 108, and communication processor 218 may have separate components or instances dedicated to different radio communication technologies and/or unified components shared by different radio communication technologies. For example, in various aspects, multiple controllers of communication processor 218 may be configured to execute multiple protocol stacks, each dedicated to a different radio communication technology and residing either on the same processor or on different processors. In various aspects, multiple digital signal processors of communication processor 218 may include separate processors and/or hardware accelerators each dedicated to different radio communication technologies, and/or one or more processors and/or hardware accelerators shared by multiple radio communication technologies. In various aspects, the RF transceiver(s) 108 may include separate RF circuit sections associated with different respective radio communication technologies and/or RF circuit sections shared by multiple radio communication technologies. In some cases, the antenna system 106 may include separate antennas associated with different respective radio communication technologies and/or antennas shared by multiple radio communication technologies. Accordingly, the antenna system 106, the RF transceiver(s) 108, and the communication processor 218 may have separate and/or shared components dedicated to multiple radio communication technologies.

The communication processor 218 may be configured to implement one or more vehicle-to-everything (V2X) communication protocols, which may include vehicle-to-vehicle (V2V), vehicle-to-infrastructure (V2I), vehicle-to-network (V2N), vehicle-to-pedestrian (V2P), vehicle-to-device (V2D), vehicle-to-grid (V2G), and other protocols. The communication processor 218 may be configured to transmit communications, such as communications (one-way or two-way) between the vehicle 100 and one or more other (target) vehicles in the vicinity of the vehicle 100 (e.g., to facilitate coordination of navigation of the vehicle 100 with respect to or together with other (target) vehicles in the vicinity of the vehicle 100), or even a broadcast transmission to unspecified receivers in the vicinity of the transmitting vehicle 100.

The communication processor 218 may be configured to operate in accordance with various desired radio communication protocols or standards via a first RF transceiver of the one or more RF transceivers 108. For example, the communication processor 218 may be configured according to a short-range cellular communication standard, such as Bluetooth, Zigbee, and the like, and the first RF transceiver may conform to the corresponding short-range cellular communication standard. As another example, the communication processor 218 may be configured to operate via a second RF transceiver of the one or more RF transceivers 108 in accordance with a medium- or long-range cellular communication standard, such as a 3G (e.g., Universal Mobile Telecommunications System-UMTS), a 4G (e.g., Long Term Evolution—LTE), or a 5G cellular communication standard in accordance with the corresponding 3GPP (3rd Generation Partnership Project) standards. As another example, the communication processor 218 may be configured to operate via a third RF transceiver of the one or more RF transceivers 108 in accordance with a wireless local area network communication protocol or standard, such as in accordance with IEEE 802.11 (e.g., 802.11, 802.11a, 802.11b, 802.11g, 802.11n, 802.11p, 802.11-12, 802.11ac, 802.11ad, 802.11ah, and the like). The one or more RF transceivers 108 may be configured to transmit signals via the antenna system 106 over an air interface. The RF transceivers 108 may each have a corresponding antenna element of the antenna system 106 or may share an antenna element of the antenna system 106.

The memory 214 may be a storage component of the vehicle 100, such as a hard disk or other permanent storage device. Although not explicitly shown in FIGS. 1 and 2, the various other components of the vehicle 100, such as one or more processors 102 may additionally each have integrated permanent and non-permanent memory components, such as for storing software program code, buffering data, etc.

The antenna system 106 may include a single antenna or multiple antennas. In various aspects, each of the one or more antennas of the antenna system 106 may be located at multiple locations on the vehicle 100 to provide maximum RF coverage. The antennas may include a phased antenna array, a switch beam antenna array with multiple antenna elements, etc. The antenna system 106 may be configured to operate according to analog and/or digital beamforming schemes to maximize signal gain and/or provide a high degree of information protection. The antenna system 106 may include separate antennas, each dedicated to different radio communication technologies, and/or antennas shared by multiple radio communication technologies. Although shown as a single element in FIG. 1, the antenna system 106 may include a plurality of antenna elements (e.g., antenna arrays) positioned at different locations on the vehicle 100. The placement of the plurality of antenna elements may be strategically selected to provide a desired level of RF coverage. For example, additional antennas may be located at the front, rear, corners, and/or sides of the vehicle 100.

The data collection devices 112 may include any number of data collection devices and components, depending on the requirements of a particular application. These may include: Image capture devices, proximity detectors, acoustic sensors, infrared sensors, piezoelectric sensors, etc., that provide data about the vehicle environment. Image capture devices can be cameras (e.g. standard cameras, digital cameras, video cameras, SLR cameras, infrared cameras, stereo cameras, etc.), charge-coupled devices (CCDs) or any type of image sensor. Proximity detectors include radar sensors, LIDAR sensors (light detection and ranging), mmWave radar sensors, etc. Acoustic sensors can be: Microphones, sonar sensors, ultrasonic sensors, etc. Accordingly, each of the data collection devices may be configured to collect a particular type of data from the environment of the vehicle 100 and relay the data to the data collection processor 214 to provide the vehicle with an accurate representation of the vehicle's environment. The data acquisition devices 112 may be configured to implement pre-processed sensor data, such as radar target lists or LIDAR target lists, in conjunction with the captured data.

The measurement devices 116 may also include other devices for measuring vehicle condition parameters, such as a speed sensor (e.g., a tachometer) for measuring the speed of the vehicle 100, one or more accelerometers (either uniaxial or multiaxial) for measuring accelerations of the vehicle 100 along one or more axes, a gyroscope for measuring orientation and/or angular velocity, odometers, altimeters, thermometers, etc. It will be understood that the vehicle 100 may have different measuring devices 116 depending on the type of vehicle, e.g. car, drone or boat.

Positioning devices 114 may include components for determining the position of the vehicle 100. These may include, for example, global positioning system (GPS) or other global navigation satellite system (GNSS) circuitry configured to receive signals from a satellite system and determine a position of the vehicle 100. Accordingly, the positioning devices 114 may provide the vehicle 100 with satellite navigation capabilities.

The one or more memories 104 may store data, such as in a database or other format, which may correspond to a map. For example, the map may indicate the location of known landmarks, roads, paths, network infrastructure elements, or other elements of the environment surrounding the vehicle 100. The one or more processors 102 may process sensory information (e.g., images, radar signals, depth information from LIDAR, or stereo processing of two or more images) of the environment of the vehicle 100 along with positional information, e.g., a GPS coordinate, ego-motion of the vehicle, etc., to determine a current position of the vehicle 100 relative to the known landmarks and refine the determination of the vehicle position. Certain aspects of this technology may be included in a localization technology such as a mapping and routing model.

The map database (DB) 204 may include any type of database that stores (digital) map data for the vehicle 100, e.g., for the control system 200. The map database 204 may include data related to the location of various objects in a reference coordinate system, such as roads, water features, geographic features, businesses, landmarks, restaurants, gas stations, etc. The map database 204 may store not only the locations of such objects, but also descriptors relating to such objects, such as names associated with one of the stored features. In various aspects, a processor of the one or more processors 102 may download information from the map database 204 via a wired or wireless data connection to a communication network (e.g., via a cellular network and/or the Internet, etc.). In some cases, the map database 204 may store a sparse data model including polynomial representations of certain road features (e.g., lane markings) or destination trajectories for the vehicle 100. The map database 204 may also include stored representations of various recognized landmarks that may be provided to determine or update a known position of the vehicle 100 with respect to a target trajectory. The representations of the landmarks may include data fields such as the type of landmark, the location of the landmark, and other possible identifiers.

Furthermore, the control system 200 may include a driving model that is implemented, for example, in an advanced driver assistance system (ADAS) and/or a driver assistance and (at least partially) automated driving system. For example, the control system 200 may include (e.g., as part of the driving model) a computer implementation of a formal model such as a safety driving model. A safe driving model may be or include a mathematical model that formalizes an interpretation of applicable laws, standards, guidelines, etc., applicable to self-driving vehicles. A safe driving model may be designed to accomplish, for example, three goals: First, the interpretation of the law should be sound in the sense that it is consistent with human interpretation of the law; second, the interpretation should lead to a sensible driving policy, i.e. an agile driving policy and not an overly defensive driving policy that would inevitably confuse other human drivers and block traffic, which in turn would limit the scalability of system deployment; and third, the interpretation should be efficiently verifiable, i.e. it should be possible to rigorously prove that the self-driving (autonomous) vehicle correctly implements the interpretation of the law. For example, a safe driving model can be or have a mathematical model for ensuring safety that enables the detection and implementation of appropriate responses to dangerous situations so that self-inflicted accidents can be avoided.

As described above, the vehicle 100 may include the control system 200 as also described with reference to FIG. 2. The vehicle 100 may include one or more processors 102 integrated into or separate from an engine control unit (ECU), which may be included in the mobility system 120 of the vehicle 100. The control system 200 may generally generate data to control or assist in controlling the ECU and/or other components of the vehicle 100 to directly or indirectly control movement of the vehicle 100 via the mobility system 120. The one or more processors 102 of the vehicle 100 may be configured to implement the aspects and methods described herein.

The components shown in FIG. 1 and FIG. 2 may be interconnected via any suitable interfaces. Furthermore, not all connections between components are explicitly shown, and other interfaces between components may be present within the scope of the present disclosure.

Various aspects herein refer to a display unit. In some embodiments, the display unit may be a display unit mounted in the vehicle 100. In other embodiments, the display unit may be a user device worn by an occupant of the vehicle 100. For example, the user device may be a head-mounted display, a tablet, a smartphone, smart glasses, etc.

In some embodiments, the vehicle 100 may be an at least partially automated vehicle (e.g., according to one of levels 2 to 5). In this case, the occupant described herein may be the driver or a passenger of the vehicle. In other embodiments, the vehicle 100 may be a non-automated vehicle. In this case, the occupant described herein may be a passenger (but not the driver).

Figure 3:
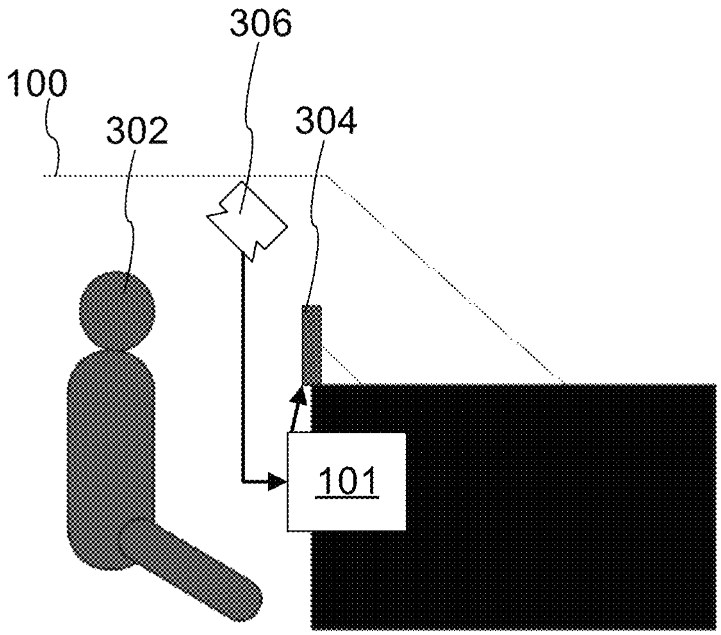
FIG. 3 shows various electronic components of the vehicle and an illustration of an occupant.

FIG. 3 shows a detail of the vehicle 100 with an occupant 302. In this example, the vehicle 100 may include a display unit 304 mounted in the vehicle 100. It will be understood that what is described below by way of example for the display unit 304 applies mutatis mutandis to user devices carried by the occupant 302.

The vehicle 100 may include an imaging unit 306 (which may be any type of imaging device described herein). The imaging unit 306 may be configured to capture second sensor data representing a head movement and/or viewing direction of the occupant 302. Illustratively, the second sensor data may represent continuous image data (e.g., video data) showing a head movement and/or direction of gaze of the occupant 302. In some embodiments, if the display unit is a display unit worn on the head by the occupant, the display unit may include an acceleration sensor configured to provide the second sensor data (as acceleration data). In this case, the imaging unit 306 is optional.

Figure 4:
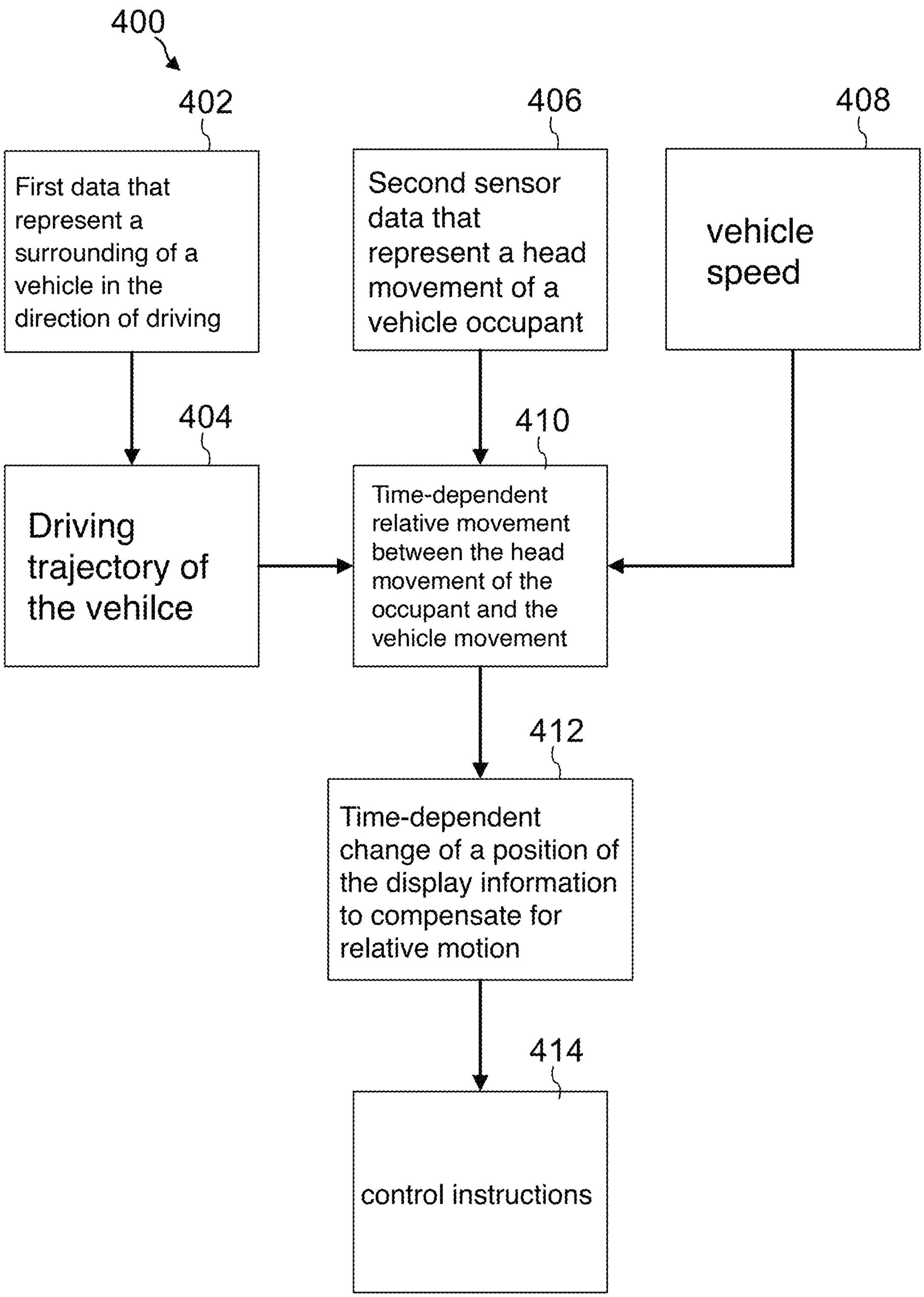
FIG. 4 shows a flowchart for controlling a display unit arranged in a vehicle according to various aspects.

FIG. 4 illustrates a flowchart 400 for controlling the display unit 304 according to various aspects. It will be understood that the control device 101 may be configured to implement these sequences. The control device 101 may be configured to receive first data 402. This first data 402 may include first sensor data 402 (e.g., from one or more data collection devices 112) and/or map data (e.g., based on terrain and other environmental information, e.g., road conditions, traffic, weather, etc.). For purposes of illustration, reference is made below to the first data 402 as first sensor data. It will be understood that this is for illustrative purposes and that the first data may additionally or alternatively include other data, such as the map data (as long as the data represents the environment of the vehicle 100). The control device 101 may be configured to receive the second sensor data 406 from the imaging unit 306.

The control device 101 may be configured to determine (e.g., for a prediction period) a driving trajectory 404 of the vehicle 100 using the first (sensor) data 402. For this purpose, the control device 101 may, for example, implement a vehicle control model, or be based on mapped terrain and other environmental information or information collected by sensors of the vehicle, e.g., road conditions, traffic, weather (also retrievable from other sources, e.g., Internet sources). The driving trajectory may be a sequence of spatio-temporal states of the vehicle 100 in a collision-free space. In some aspects, the control device 101 may be configured to determine the driving trajectory using navigation data representing a route of the vehicle 100.

The control device 101 may be configured to receive sensor data relating to a speed 408 of the vehicle 100 (e.g., from one or more than one measurement sensor 116).

The control device 101 may be configured to determine or predict a time-dependent relative movement 410 between the head movement of the occupant 302 and the vehicle movement according to the driving trajectory 404 using the speed and/or acceleration 408 of the vehicle 100, the driving trajectory 404 and the head movement and/or viewing direction of the occupant 302 according to the second sensor data 406.

The relative movement 410 can have a longitudinal relative movement (in the direction of travel) and/or a lateral relative movement (transverse to the direction of travel) and/or a vertical relative movement, and/or a rotating movement.

The control device 101 may be configured to determine (e.g., for the prediction period) a time-dependent change 412 in a position and/or orientation of display information to be displayed on the display unit 304 such that the change 412 in the position and/or orientation of the display information at least partially (e.g., completely or partially) compensates for the (e.g., lateral and/or vertical) relative movement.

The control device 101 may be configured to generate control instructions 414 for controlling the display unit 304 to display the display information according to the time-dependent change 412 in position and/or orientation.

Various aspects of how a lateral and/or vertical relative movement 410 can be compensated for by time-dependent change 412 of the position and/or orientation of the display information, and/or by controlled adjustment of a display unit (e.g., motor-controlled placement, or display unit on a controlled robotic arm) are explained below.

The display information described herein can be any type of information that can be displayed on a display unit (e.g., a display). For example, the display information may include one or more of the following display information: a text, one or more than one image, a video, a website, etc.

For example, the relative movement 410 may be the vertical time-dependent relative movement between the head movement and/or viewing direction of the occupant 302 and the vehicle movement. In this case, the time-dependent change 412 in the position and/or orientation of the display information may be a vertical change in position of the display information on the display. However, when driving on very bumpy roads, a permanent up-down shift of the display information could occur. Optionally, the system can have a user interface by means of which the occupant can manually activate/deactivate the compensation function described herein. In some embodiments, the control device 101 may be configured to determine a rate of change at which the position is changed per unit time and whether the rate of change in a time window (e.g., the prediction period) is greater than or equal to a predefined rate of change threshold. If this is the case, the change in the position of the display information in this time window can be paused and resumed as soon as the rate of change is less than the predefined rate of change threshold. For example, the control device 101 can use the vehicle movement/trajectory to recognize that the vehicle 100 is currently on a very bumpy road and can pause the change in the position of the display information in this case. Optionally, control instructions can also be generated to control the display unit 304 in order to inform the occupant 302 about the bumpy road and the associated pause.

For example, the relative movement 410 may be the lateral time-dependent relative movement between the head movement of the occupant 302 and the vehicle movement. If the display information were merely shifted laterally on the display unit, it could move out of the display area in curves, when turning, etc. Various aspects are described below that enable compensation for lateral relative movement.

Figure 5:
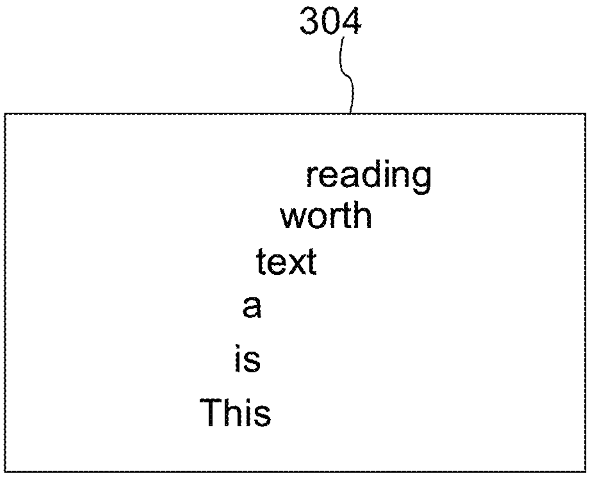
FIG. 5 and FIG. 6 each show an exemplary representation of text on a display unit according to different aspects.
Figure 6:
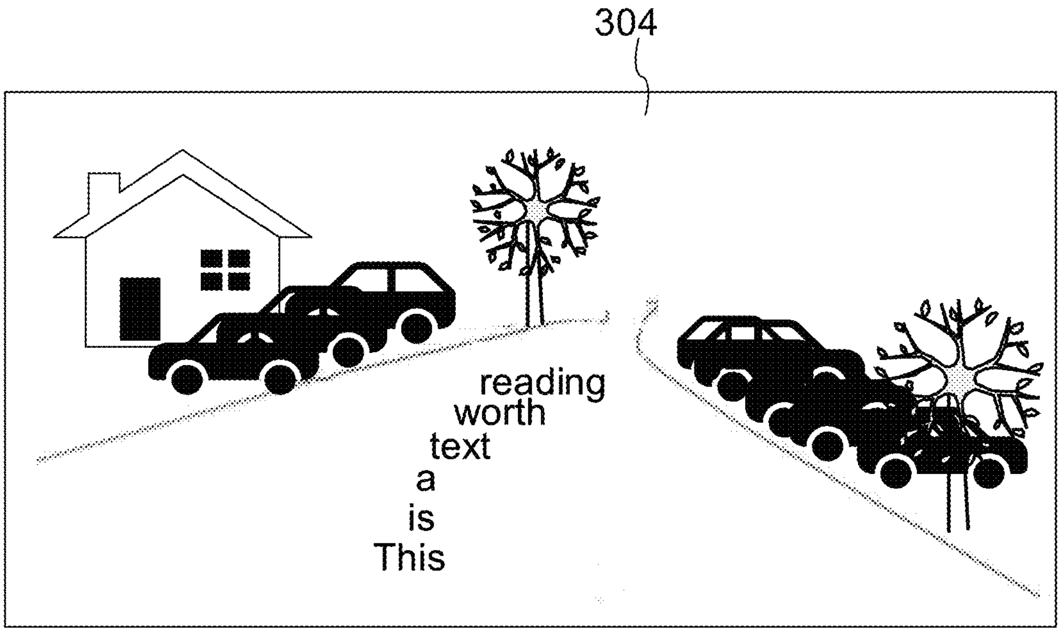

If the display information has a text, this can be displayed on the display unit 304, as shown in FIG. 5 for example, in such a way that the text follows the driving trajectory 404. In this case, the text can be read from bottom to top. The text can be displayed line by line on the display unit 304, in each line one or more than one word of the text can be displayed. In this way, the impression is created that the vehicle 100 is driving over the text. To reinforce this impression, an image of the surroundings of the vehicle 100 in the direction of travel can be displayed as a background to the text. The image can vividly serve as an artificial horizon, as shown for example in FIG. 6. In one example, the image may be an image captured by a data capture device 112, such as a camera oriented in the direction of travel. In another example, the image may be a virtual representation of the environment of the vehicle 100 in the direction of travel, wherein the virtual representation shows a road running along the driving trajectory 404.

According to various aspects, the control device 101 may further be configured to take into account a reading speed of the occupant 302. To this end, the control device 101 may be configured to determine a viewing direction of the occupant 302 using sensor data showing the eyes of the occupant 302. This sensor data can be, for example, the second sensor data (which shows the head of the occupant 302 and thus his eyes). Additionally or alternatively, third sensor data showing the eyes of the occupant 302 may be received. For example, in the case where the display unit 304 is a head-worn display of a head-worn device worn by the occupant, the head-worn device may, for example, include a camera directed at the eyes of the occupant 302 and this camera may be configured to provide the third sensor data.

The control device 101 can then determine the reading speed of the occupant 302 using the viewing direction of the occupant 302. The control device 101 may be configured to display the time-dependent change in the text displayed along the driving trajectory according to the reading speed of the occupant 302. In some aspects, the control device 101 may highlight a word and/or line of text that the occupant 302 is currently reading (e.g., using different colors, fonts, and/or other visual cues).

According to various aspects, the control device 101 may be configured to determine (using continuously provided sensor data) whether the reading speed of the occupant 302 is changing, and if it is changing, to adjust the speed at which the displayed text is changing accordingly. The control device 101 may be configured to determine whether the occupant 302 has read displayed and already hidden words of the text and, if the occupant 302 has not yet read some words, to display them again. If the reader stops reading (e.g. recognized by the fact that the line of sight is no longer in the direction of the display unit 304), the text can be hidden to prevent constant repetition of the text. This can also be extended with an option for direct user interaction, for example with a text/scroll option to scroll through the text (forwards and backwards) and/or with an option to set a specific reading speed via a menu item.

In some aspects, there may be a maximum change in position of the display information, as the display information may otherwise no longer be displayed within the display area, for example. This maximum position change may be associated with a predefined tilt angle of the driving trajectory 404 and may be stored as a predefined tilt angle threshold (for example, in the memory 104). This predefined tilt angle threshold may be exceeded, for example, in very steep curves or when turning at intersections. For example, the control device 101 may determine whether an inclination angle of the driving trajectory in a time window (e.g., the prediction period) is greater than or equal to a predefined inclination angle threshold value and, if so, may pause the change of the display information in the time window. After the time window, the display of the display information can be continued.

Figure 7:
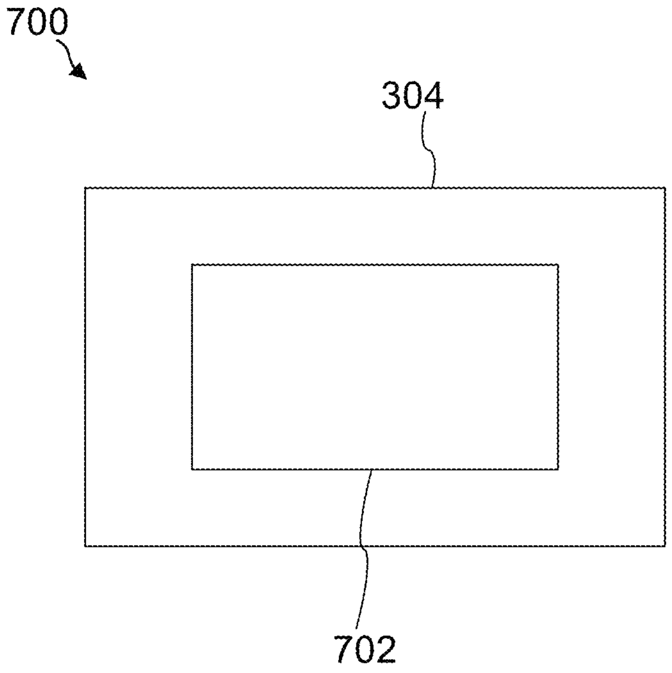
FIG. 7 shows an exemplary representation of display information in a section of the display unit according to various aspects.

According to various aspects, as shown in FIG. 7, the display information may be displayed in a section 702 of the display unit 304. For example, this section 702 may show a virtual screen (e.g., when the display information includes a video) or may show a virtual book page (e.g., when the display information includes a text). In this case, the time-dependent change 412 in the position of the display information may be a time-dependent change in a position of the section 702 on the display unit 304.

In some embodiments, if the angle of inclination of the driving trajectory 404 is greater than the predefined angle of inclination threshold, the position of the cutout 702 may be reset to a predefined position such that compensation may be made in the subsequent time window of the prediction period in which the angle of inclination of the driving trajectory 404 is greater than or equal to the predefined angle of inclination threshold. In an illustrative example, the display information may include a video and the control device 101 may determine that the tilt angle of the driving trajectory 404 is greater than or equal to the predefined tilt angle threshold during the time window. The control device 101 may determine a cut in the video that is within a predefined time interval (e.g., less than 5 seconds, e.g., less than 1 second) prior to the beginning of the time window, and may reposition (e.g., laterally) the position of the cutout 702 at a time of the cut in the video such that the lateral relative movement may be compensated for by the change in the position of the cutout 702 in the time window.

To reduce the frequency of such scenarios in which the tilt angle of the driving trajectory 404 in the time window is greater than or equal to the predefined tilt angle threshold, the control device 101 may, if it determines using the viewing direction of the occupant 302 that the occupant 302 is currently looking at the display unit 304, and if the vehicle is an autonomous vehicle or the driver is using a navigation system, determine a driving behavior of the vehicle 100 that has a reduced (predicted) lateral and/or vertical vehicle movement (e.g., a different route). If the vehicle is an autonomous vehicle (level 5), the control device 101 may be configured to influence the motion control of the vehicle 100 to favor, for example, a smooth motion with lower accelerations compared to a higher speed of the vehicle. This limits the acceleration forces and motion acting on the body of the occupant 302.

Figure 8A:
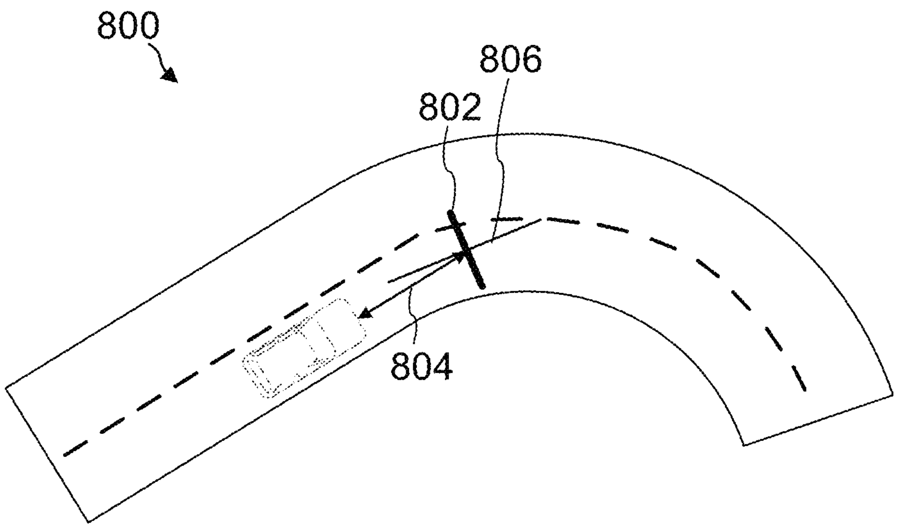
FIG. 8A to FIG. 9B show various aspects of display information.

With reference to FIG. 8A, for example, the cutout 702 may show a virtual surface (also referred to as a virtual screen) 802 at a predefined distance 804 in front of the vehicle 100. This virtual screen 802 may be positioned along the centerline of the lane and orthogonal to a tangent 806 of the lane. Optionally, the image (e.g., the camera image or the virtual representation) of the surroundings of the vehicle 100 in the direction of travel may be displayed as the background of the cutout.

The compensation of the relative movement explained above can ensure a world-fixed display of display information. World-fixed, as used herein, can be understood as a fixed position in an earth-bound coordinate system. A world-fixed coordinate system can also be referred to as an earth-fixed coordinate system or geocentric coordinate system. The compensation of the relative movement means, for example, that an internal perception of movement of the occupant (as a result of the vehicle movement) and a perception of movement of the occupant by means of the eyes (by looking at the display unit) are synchronized. This synchronization has the advantage, for example, that the occupant does not get motion sickness.

Figure 8B:
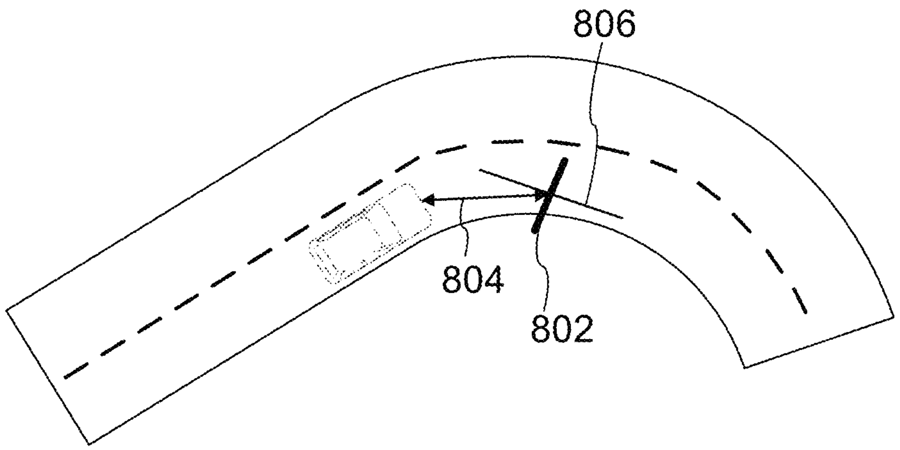

As explained above, restrictions may occur at tilt angles greater than or equal to the predefined tilt angle threshold. With respect to the exemplary scenario of the virtual screen 802, FIG. 8B shows that the virtual screen 802 may not be completely within the field of view of the display unit 304 depending on the vehicle movement/track shape. In this case, parts would be projected outside the screen.

According to various aspects, a tolerance value representing a tolerance of an inertial system of the occupant 302 may be considered. In this case, the tolerance value may descriptively indicate a margin for compensating the relative motion by the time-dependent change 412 of the position of the display information. The tolerance of a human's inertial system may be a motion tolerance of the human perceptual system. In illustrative terms, smaller discrepancies between eye and inertial measurements can be tolerated or not recognized at all. In this way, virtual trajectories can be generated that are equivalent to the real movement and allow a displacement of the section 702 (even at tilt angles greater than or equal to the predefined tilt angle threshold). The displacement can take place both in the direction of the center of the path as well as towards the tangent 806 of the path.

Figure 9A:
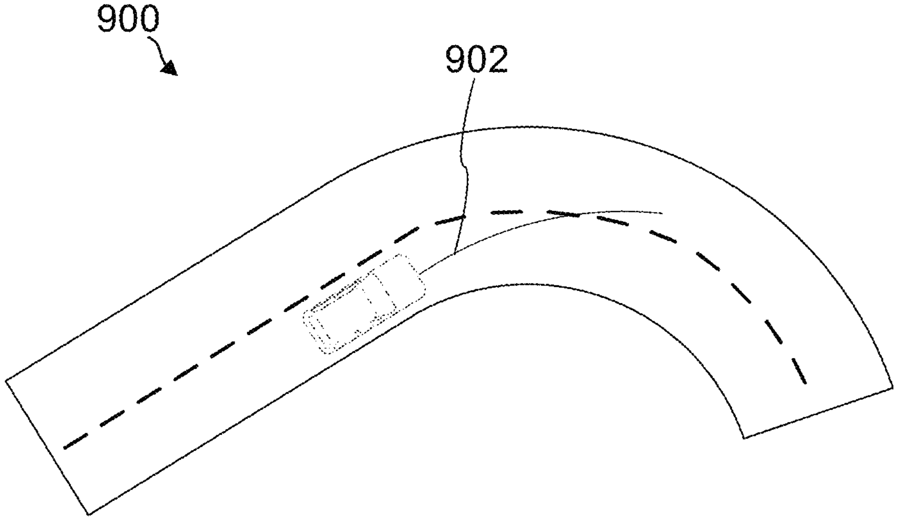
Figure 9B:
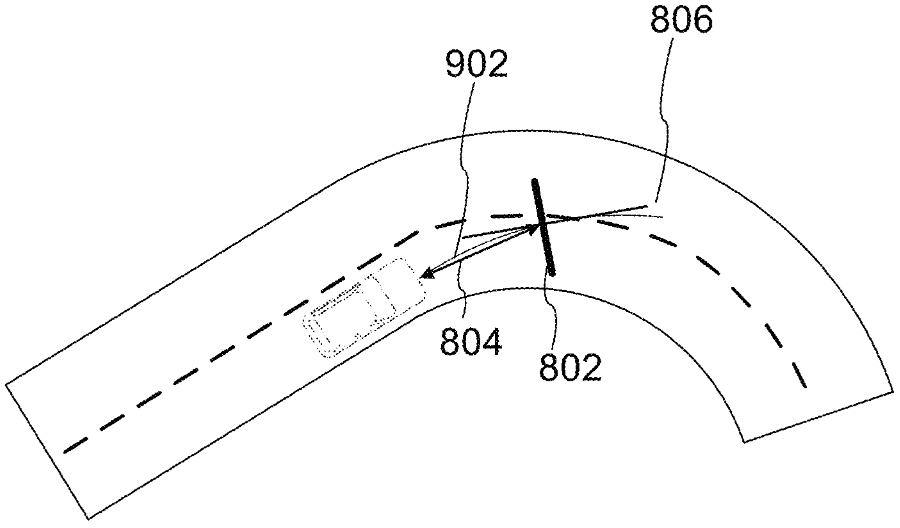

In this regard, FIG. 9A shows a tolerated movement 902 determined using the tolerance value of the occupant 302 and FIG. 9B shows the correspondingly positioned virtual screen 802.

According to various aspects, the memory of the control device 101 may store, for one or more than one occupant, respective associated identification data for identifying the occupant and an associated tolerance value. The control device 101 may be configured to determine the current occupant (e.g., the person looking at the display unit 304) using the second sensor data and/or the sensor data showing the occupant's eyes and/or other sensor data enabling identification of the occupant, and may determine the associated tolerance value from the memory. The control device 101 can determine the time-dependent change in the position of the display information such that a difference between the change in position and the relative movement is less than or equal to the assigned tolerance value.

Figure 10:
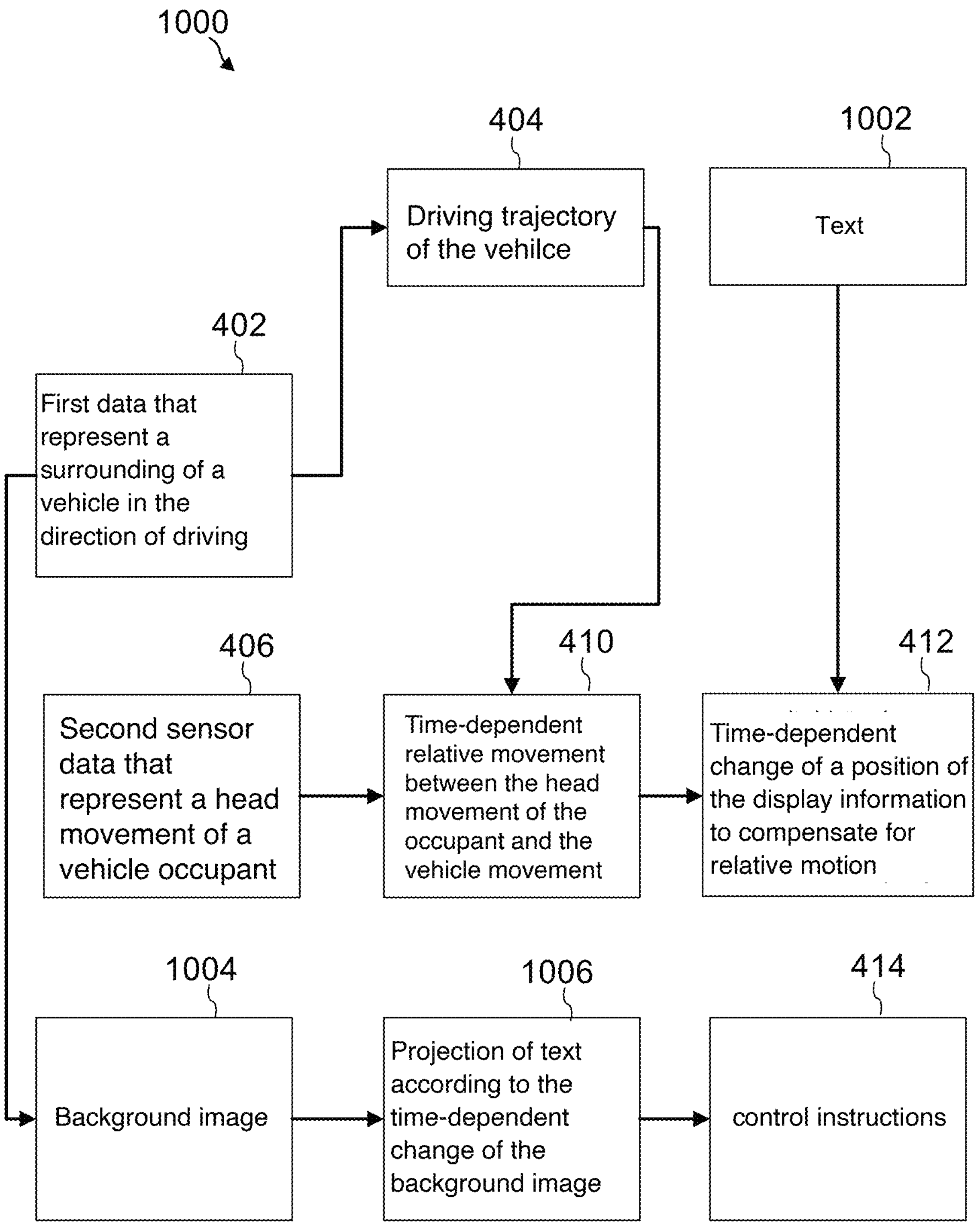
FIG. 10 shows a flowchart for controlling a display unit arranged in a vehicle according to various aspects.

FIG. 10 shows an exemplary flowchart 1000 for controlling the display unit 304 to display text 1002 (as display information) according to various aspects.

In this exemplary embodiment, the control device 101 may use the first (sensor) data to generate the image (e.g., the camera image or the virtual representation) of the environment of the vehicle 100 in the direction of travel as a background image 1004.

The control device 101 may project the text 1002 onto the background image 1004 according to the position indicated by the time-dependent change 412 in the position of the display information (i.e., the text 1002 in this case) and generate a corresponding rendered image 1006. The control device 101 may then generate the control instructions 414 for controlling the display unit 304 to display the rendered image.

Figure 11:
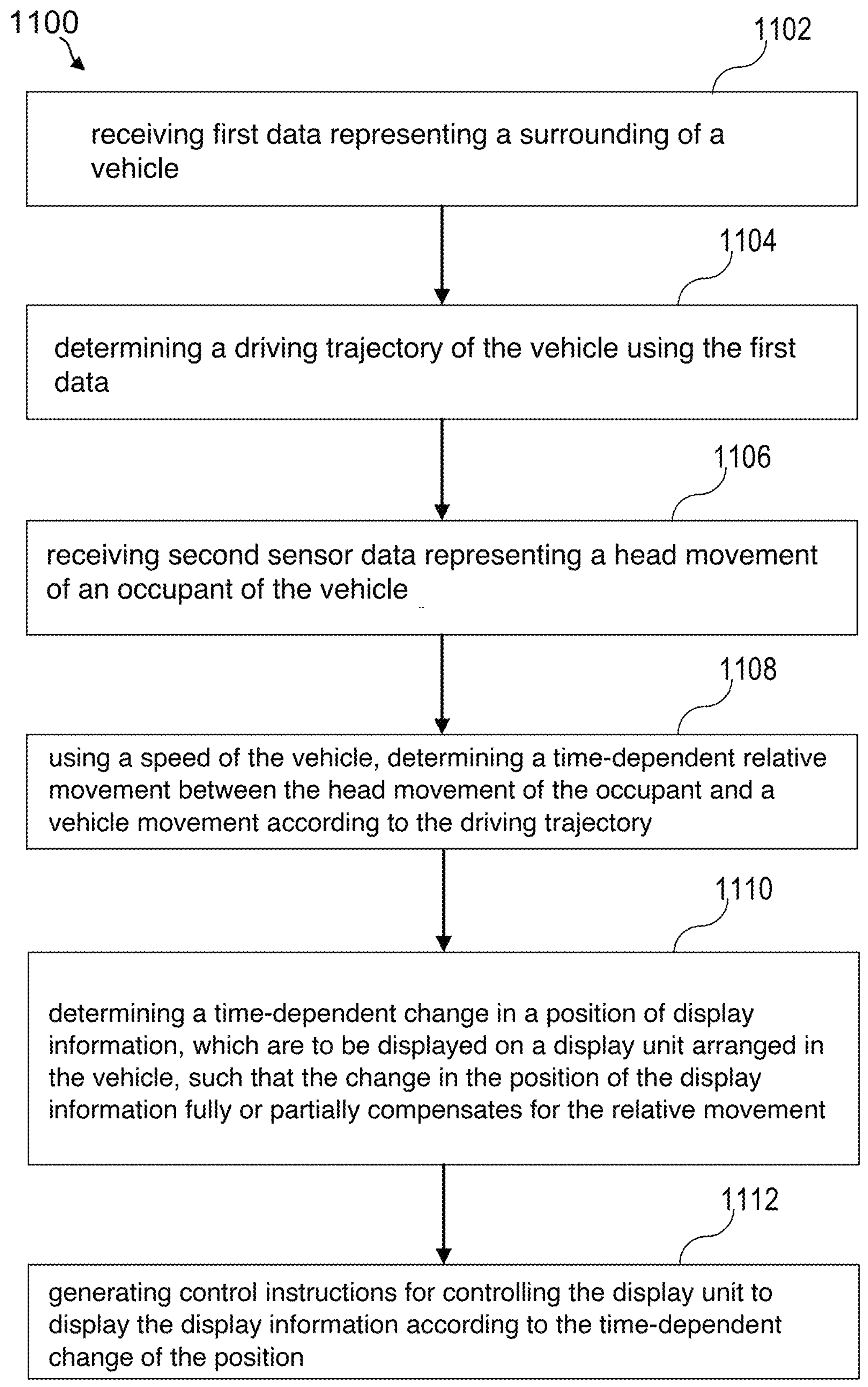
FIG. 11 shows a flow chart of a method for controlling a display unit arranged in a vehicle.

FIG. 11 shows a flowchart of a method 1100 for controlling a display unit arranged in a vehicle according to various aspects.

The method 1100 may include (in 1102) receiving first data (e.g., the first sensor data) representing an environment of a vehicle (e.g., in the direction of travel).

The method 1100 may include (in 1104) determining a driving trajectory of the vehicle (e.g., for a prediction period) using the first data.

The method 1100 may include (in 1106) receiving second sensor data representing a head movement of an occupant of the vehicle.

The method 1100 may include (in 1108) determining a time-dependent relative movement between the occupant's head movement and a vehicle movement according to the driving trajectory using a speed of the vehicle.

The method 1100 may (in 1110) include determining a time-dependent change in a position of display information to be displayed on a display unit arranged in the vehicle (e.g., for the prediction period) such that the change in the position of the display information at least partially (e.g., entirely or partially) compensates for the relative movement.

The method 1100 may include (in 1112) generating control instructions for controlling the display unit to display the display information according to the time-dependent change in position.

Various examples are provided below that describe one or more aspects of the control device 101 and the method 1100. It will be understood that aspects described with respect to the control device 101 may also apply to the method 1100, and vice versa.

Example 1 is a control device for controlling a display unit arranged in a (e.g. autonomous or semi-autonomous) vehicle, the control device including a processor configured: to receive first sensor data representing an environment of a vehicle (e.g. in the direction of travel); using the first data to determine a (predicted) driving trajectory of the vehicle (e.g. for a prediction period; to receive second sensor data representing a head movement of an occupant of the vehicle; to determine a predicted driving trajectory of the vehicle (e.g. for a prediction period); and to determine a predicted driving trajectory of the vehicle (e.g. for a prediction period); to determine a time-dependent relative movement between the head movement of the occupant and a vehicle movement according to the (predicted) driving trajectory using a velocity of the vehicle; to determine (e.g. for the prediction period) a relative movement between the head movement of the occupant and a vehicle movement according to the (predicted) driving trajectory, a time-dependent change in a position of display information (e.g. text and/or a video) to be displayed on a display unit arranged in the vehicle such that the change in the position of the display information compensates for all or part of the relative movement; and to generate control instructions for controlling the display unit to display the display information according to the time-dependent change in the position. For example, the occupant may use his or her time in an at least partially automated vehicle to read, work, watch a movie, etc.

Example 2 is a control device for controlling a display unit arranged in a (e.g. autonomous or semi-autonomous) vehicle, the control device including a processor configured to: receive (first) (sensor) data representing an environment of a vehicle (e.g. in the direction of travel); using the (first) data to determine a (predicted) driving trajectory of the vehicle (e.g. for a prediction period); using a speed of the vehicle to determine a time-dependent vehicle movement according to the (predicted) driving trajectory; (e.g. a time-dependent change in a position of display information (e.g. text and/or a video) to be displayed on a display unit arranged in the vehicle such that the change in the position of the display information compensates for the vehicle movement; and to generate control instructions for controlling the display unit to display the display information according to the time-dependent change in the position.

Example 3 is configured according to example 2, wherein the processor is further configured: to receive second sensor data representing a head movement of an occupant of the vehicle; to determine a time-dependent relative movement between the head movement of the occupant and the vehicle movement using the speed of the vehicle; and to determine (e.g., for the prediction period) the time-dependent change in position of the display information (e.g., text and/or a video) such that the change in position of the display information at least partially (e.g., fully or partially) compensates for the relative movement.

Example 4 is configured according to example 1 or 3, wherein the processor is further configured: to determine a predicted vertical movement of the vehicle using the first data, wherein the time-dependent relative movement includes a time-dependent relative vertical movement between the head movement of the occupant and the predicted vertical movement of the vehicle; and/or to determine a predicted lateral movement of the vehicle using the first data, wherein the time-dependent relative movement includes a time-dependent relative lateral movement between the head movement of the occupant and the predicted lateral movement of the vehicle.

Example 5 is configured according to any one of examples 1 to 4, wherein the display unit is mounted in the vehicle; or wherein the display unit is a display unit of a user device worn by the occupant (e.g. a head-mounted display, a tablet or smart glasses).

Example 6 is configured according to any one of examples 1 to 5, wherein the display information includes a text; wherein the processor is configured: to determine the time-dependent change in position of the text such that the text to be displayed on the display unit follows the driving trajectory.

Example 7 is configured according to example 6, wherein the processor is configured to determine the time-dependent change in the position of the text in such a way that the text to be displayed on the display unit is to be read from bottom to top.

Example 8 is configured according to example 6 or 7, wherein the processor is configured to determine the time-dependent change in the position of the text such that the text is to be displayed line by line on the display unit and that one or more than one word of the text is to be displayed in each line.

Example 9 is configured according to any one of examples 6 to 8, wherein the first sensor data includes image data showing an image in the direction of travel of the vehicle; wherein the processor is configured: to generate the control instructions for displaying at least a portion of the image on the display unit as a background of the text (e.g. as an artificial horizon).

Example 10 is configured according to any one of examples 6 to 8, wherein the processor is configured to: generate a virtual representation of an environment of the vehicle in the driving direction, the virtual representation showing a road running along the driving trajectory; generate the control instructions for displaying the virtual representation as a background of the text (e.g. as an artificial horizon).

Example 11 is configured according to any one of examples 1 to 10, wherein the display information includes a text; wherein the second sensor data includes image data showing at least eyes of the occupant and/or wherein the processor is configured to receive third sensor data including image data showing at least eyes of the occupant; wherein the processor is configured: to determine a viewing direction of the occupant using the image data; to determine a reading speed of the occupant using the viewing direction of the occupant; and to determine the time-dependent change in position of the display information using the reading speed of the occupant (e.g. by correlating vehicle speed with reading speed), the reading speed of the occupant (e.g. by correlating vehicle speed with reading speed).

Example 12 is configured according to Example 11, wherein the processor is configured to: determine whether the occupant is looking at the display unit using the occupant's viewing direction; if it is determined that the occupant is looking at the display unit, determine the occupant's reading speed.

Example 13 is configured according to example 11 or 12, wherein the processor is configured: to generate the control instructions for controlling the display unit such that a (e.g. color) highlighting of one or more than one word of the text is changed in time according to the reading speed of the occupant.

Example 14 is configured according to any one of examples 11 to 13, wherein the processor is configured to: continuously receive image data showing at least the occupant's eyes; determine, using the continuous image data, whether the occupant's reading speed is changing; and if it is determined that the occupant's reading speed is changing, adjust the control instructions to adjust the time-dependent change in position of the display information to match the change in reading speed.

Example 15 is configured according to Example 14, wherein the processor is configured to: determine whether the occupant has read displayed and already hidden words of the text; if it is determined that the occupant has not yet read displayed and already hidden words of the text, adjust the control instructions to redisplay the already hidden words.

Example 16 is configured according to any one of examples 1 to 15, wherein the processor is configured: to determine whether an inclination angle of the driving trajectory in a time window (e.g., the prediction period) is greater than or equal to a predefined inclination angle threshold (e.g., due to a turn at an intersection); and if it is determined that the inclination angle of the driving trajectory in a time window is greater than or equal to the predefined inclination angle threshold, to determine the time-dependent inclination angle of the driving trajectory in the time window, due to a turn at an intersection); and if it is determined that the inclination angle of the driving trajectory in a time window is greater than or equal to the predefined inclination angle threshold, to determine the time-dependent change in the position of the display information such that a change (e.g. both the position and the text itself) of the display information in the time window is paused.

Example 17 is configured according to any one of examples 1 to 16, wherein the display information includes a video; wherein the control instructions indicate that the video is to be displayed in a portion of the display unit (e.g., as a virtual screen); wherein the processor is configured: to determine whether a tilt angle of the driving trajectory in a time window (e.g., of the prediction period) is greater than or equal to a predefined tilt angle threshold; and if it is determined that the tilt angle of the driving trajectory in a time window (e.g., of the prediction period) is greater than or equal to the predefined tilt angle threshold, to determine a cut in the video that is within a predefined time interval before the start of the time window; characterized in that the processor is configured: to determine whether a tilt angle of the driving trajectory in a time window (e.g., of the prediction period) is greater than or equal to the predefined tilt angle threshold; and to determine a cut in the video that is within a predefined time interval before the start of the time window, the prediction period) is greater than or equal to the predefined tilt angle threshold; and when it is determined that the tilt angle of the driving trajectory in a time window (e.g., the prediction period) is greater than or equal to the predefined tilt angle threshold, determining a cut in the video that is within a predefined time interval before the start of the time window; and repositioning the position of the cut at a time of the cut in the video such that lateral relative movement can be compensated for by the change in the position of the cut in the time window.

Example 18 is configured according to any one of examples 1 to 17, wherein the control instructions indicate that the display information is to be displayed in a section of the display unit (e.g. as a virtual screen in the case of a video or a virtual book page in the case of a text); wherein the time-dependent change in the position of the display information is a time-dependent change in the position of the section (on the display unit).

Example 19 is configured according to one of examples 1 to 18, wherein the display information includes a text (to be read) and/or a video.

Example 20 is configured according to any one of examples 1 to 19, wherein the processor is configured to determine the driving trajectory of the vehicle (e.g. for the prediction period) using navigation data representing a route of the vehicle.

In example 21, the control device according to any one of examples 1 to 20 may optionally further include: a memory device storing, for one or more than one occupant, respective associated identification data for identifying the occupant and an associated tolerance value, wherein the tolerance value represents a tolerance of an inertial system of the occupant; wherein the second sensor data includes image data showing at least a head of the occupant; wherein the processor is configured to determine a (current) occupant and the associated tolerance value using the image data and the identification data; to determine the time-dependent change in position of the display information such that a difference between the change in position and the relative movement is less than or equal to the associated tolerance value.

Example 22 is configured according to any one of examples 1 to 21, wherein the processor is configured: to determine a rate of change at which the position is changed per unit time using the time-dependent change in the position; to determine whether the rate of change in a time window (e.g. the prediction period) is greater than or equal to a predefined rate of change threshold; and if it is determined that the rate of change in a time window (e.g., the prediction period) is greater than or equal to a predefined rate of change threshold, determining the control instructions such that a change (e.g., both the position and the text itself) of the display information in the time window is paused.

Example 23 is configured according to any one of examples 1 to 22, wherein the second sensor data includes image data showing at least eyes of the occupant and/or wherein the processor is configured to receive third sensor data including image data showing at least eyes of the occupant; wherein the processor is configured to using the image data, determine a viewing direction of the occupant; using the viewing direction of the occupant, determine whether the occupant is looking at the display unit; if it is determined that the occupant is looking at the display unit, determine a driving behavior of the vehicle having a reduced (predicted) lateral and/or vertical vehicle movement (e.g., a different route and/or with a different direction), a different route and/or with a reduced acceleration and/or a reduced top speed, etc.); and to generate control instructions for controlling the vehicle according to the (determined) driving behavior.

Example 24 is an (at least partially automated) vehicle which has the display unit and the control device according to one of examples 1 to 23.

Example 25 is configured according to example 24, wherein the vehicle further includes: a first imaging unit (e.g. including a camera and/or a lidar sensor and/or a radar sensor) configured to capture the first sensor data; and/or a second imaging unit (e.g. a camera) configured to capture the second sensor data.

Example 26 is a method for controlling a display unit arranged in a (e.g. autonomous or semi-autonomous) vehicle, the method including: receiving first data representing an environment of a vehicle (e.g. in a driving direction); using the first data, determining a (predicted) driving trajectory of the vehicle (e.g. for a prediction period); receiving second sensor data representing a head movement of an occupant of the vehicle; using a speed of the vehicle, determining a time-dependent relative movement between the head movement of the occupant and a vehicle movement according to the (predicted) driving trajectory; determining a time-dependent change in a position of display information (e.g., text and/or a video, e.g. text and/or a video) to be displayed on a display unit arranged in the vehicle (e.g. for the prediction period) such that the change in position of the display information at least partially (e.g. fully or partially) compensates for the relative movement; and generating control instructions for controlling the display unit to display the display information according to the time-dependent change in position.

Example 27 is a method for controlling a display unit arranged in a (e.g. autonomous or semi-autonomous) vehicle, the method including: receiving (first) data representing an environment of a vehicle (e.g. in driving direction); using the (first) data, determining a (predicted) driving trajectory of the vehicle (e.g. for a prediction period); using a speed of the vehicle, determining a time-dependent vehicle movement according to the (predicted) driving trajectory; determining a time-dependent change of a position of display information; using a speed of the vehicle, determining a time-dependent vehicle movement according to the (predicted) driving trajectory; determining a time-dependent change of a position of display information according to the (predicted) driving trajectory (e.g., for a prediction period); using a speed of the vehicle, determining a time-dependent vehicle movement according to the (predicted) driving trajectory; determining a time-dependent change in a position of display information (e.g., text and/or a video, e.g., a video); using the (first) data, determining a (predicted) driving trajectory of the vehicle (e.g., for a prediction period) e.g. text and/or a video) to be displayed on a display unit arranged in the vehicle (e.g. for the prediction period) such that the change in position of the display information compensates n for the vehicle movement; and generating control instructions for controlling the display unit to display the display information according to the time-dependent change in position.

Example 28 is the method of example 27, further including: receiving second sensor data representing a head movement of an occupant of the vehicle; using the speed of the vehicle, determining a time-dependent relative movement between the head movement of the occupant and the vehicle movement; and determining the time-dependent change in position of the display information (e.g., text and/or a video) (e.g., for the prediction period) such that the change in position of the display information at least partially (e.g., fully or partially) compensates for the relative movement.

Example 29 is the method of example 26 or 28, further including: using the first data, determining a predicted vertical movement of the vehicle, wherein the time-dependent relative movement includes a time-dependent relative vertical movement between the head movement of the occupant and the predicted vertical movement of the vehicle; and/or using the first data, determining a predicted lateral movement of the vehicle, wherein the time-dependent relative movement includes a time-dependent relative lateral movement between the head movement of the occupant and the predicted lateral movement of the vehicle.

Example 30 is configured according to any one of examples 26 to 29, wherein the display unit is mounted in the vehicle; or wherein the display unit is a display unit of a user device worn by the occupant (e.g. a head-mounted display, a tablet, or smart glasses).

Example 31 is configured according to any one of examples 26 to 30, wherein the display information includes a text; the method further including: determining the time-dependent change in position of the text such that the text to be displayed on the display unit follows the driving trajectory.

Example 32 is configured according to example 31, wherein the time-dependent change in the position of the text is determined in such a way that the text to be displayed on the display unit is to be read from bottom to top.

Example 33 is configured according to example 31 or 32, wherein the time-dependent change in the position of the text is determined such that the text is to be displayed line by line on the display unit and that one or more than one word of the text is to be displayed in each line.

Example 34 is configured according to any one of examples 31 to 33, wherein the first sensor data includes image data showing an image in the direction of travel of the vehicle; generating the control instructions for displaying at least a portion of the image on the display unit as a background of the text (e.g. as an artificial horizon).

Example 35 is the method according to any one of examples 31 to 33, further including: generating a virtual representation of an environment of the vehicle in the driving direction, the virtual representation showing a road running along the driving trajectory; generating the control instructions for displaying the virtual representation as a background of the text (e.g. as an artificial horizon).

Example 36 is configured according to any one of examples 26 to 35, wherein the display information includes a text; wherein the second sensor data includes image data showing at least eyes of the occupant and/or wherein the processor is configured to receive third sensor data including image data showing at least eyes of the occupant; wherein the method further includes: using the image data, determining a viewing direction of the occupant; using the viewing direction of the occupant, determining a reading speed of the occupant; and wherein the time-dependent change in position of the display information is determined using the reading speed of the occupant (e.g. by correlating vehicle speed with reading speed), the reading speed of the occupant (e.g. by correlating vehicle speed with reading speed).

Example 37 is the method according to example 36, further including: using the occupant's viewing direction, determining whether the occupant is looking at the display unit; if it is determined that the occupant is looking at the display unit, determining the occupant's reading speed.

Example 38 is configured according to example 36 or 37, wherein the control instructions for controlling the display unit are generated such that a highlighting (e.g. in color) of one or more than one word of the text is changed in time according to the reading speed of the occupant.

Example 39 is the method according to any one of examples 36 to 38, further including: receiving continuous image data showing at least the eyes of the occupant; using the continuous image data, determining whether the reading speed of the occupant changes; and if it is determined that the reading speed of the occupant changes, adjusting the control instructions to adjust the time-dependent change in the position of the display information to the changed reading speed.

Example 40 is the method of example 39, further including: determining whether the occupant has read displayed and already hidden words of the text; if it is determined that the occupant has not yet read displayed and already hidden words of the text, adjusting the control instructions to redisplay the already hidden words.

Example 41 is the method according to any one of examples 26 to 40, further including: determining whether a tilt angle of the driving trajectory in a time window (e.g., the prediction period) is greater than or equal to a predefined tilt angle threshold (e.g., due to a turn at an intersection); and wherein, when it is determined that the tilt angle of the driving trajectory in a time window (e.g., the prediction period) is greater than or equal to the predefined tilt angle threshold, the time-dependent change in the position of the display information is determined such that a change (e.g., both the position and the tilt angle) in a time window (e.g., the prediction period) is greater than or equal to the predefined tilt angle threshold, the time-dependent change in the position of the display information is determined such that a change (e.g. both the position and the text itself) of the display information in the time window is paused.

Example 42 is configured according to any one of examples 26 to 41, wherein the display information includes a video; wherein the control instructions indicate that the video is to be displayed in a portion of the display unit (e.g., as a virtual screen); the method further including: determining whether a tilt angle of the driving trajectory in a time window (e.g., the prediction period) is greater than or equal to a predefined tilt angle threshold; and if it is determined that the tilt angle of the driving trajectory in a time window (e.g., the prediction period) is greater than or equal to the predefined tilt angle threshold, determining a cut in the video that is within a predefined time interval before the start of the time window; and laterally repositioning the position of the cutout at a time of the cut in the video such that lateral relative movement can be compensated for by the change in the position of the cutout in the time window.

Example 43 is configured according to any one of examples 26 to 42, wherein the control instructions indicate that the display information is to be displayed in a section of the display unit (e.g. as a virtual screen in the case of a video or a virtual book page in the case of a text); wherein the time-dependent change in the position of the display information is a time-dependent change in the position of the section (on the display unit).

Example 44 is configured according to any one of examples 26 to 43, wherein the display information includes a text (to be read) and/or a video.

Example 45 is configured according to any one of examples 26 to 44, wherein the driving trajectory of the vehicle (e.g. for the prediction period) is determined using navigation data representing a route of the vehicle.

Example 46 is configured according to any one of examples 26 to 45, wherein a storage device for one or more than one occupant stores respective associated identification data for identifying the occupant and an associated tolerance value, the tolerance value representing a tolerance of an inertial system of the occupant; wherein the second sensor data includes image data showing at least a head of the occupant; the method further including using the image data and the identification data, determining a (current) occupant and the associated tolerance value; wherein the time-dependent change in position of the display information is determined such that a difference between the change in position and the relative movement is less than or equal to the associated tolerance value.

Example 47 is the method according to any one of examples 26 to 46, further including: using the time-dependent change in position, determining a rate of change at which the position is changed per unit time; determining whether the rate of change in a time window (e.g. of the prediction period) is greater than or equal to a predefined rate of change threshold; and if it is determined that the rate of change in a time window (e.g., the prediction period) is greater than or equal to a predefined rate of change threshold, determining the control instructions such that a change (e.g., both the position and the text itself) of the display information in the time window is paused.

Example 48 is configured according to any one of examples 26 to 47, wherein the second sensor data includes image data showing at least eyes of the occupant and/or wherein the processor is configured to receive third sensor data including image data showing at least eyes of the occupant; the method further including using the image data, determining a viewing direction of the occupant; using the viewing direction of the occupant, determining whether the occupant is looking at the display unit; if it is determined that the occupant is looking at the display unit, determining a driving behavior of the vehicle having a reduced (predicted) lateral and/or vertical vehicle movement (e.g., a different route and/or having a different direction of travel). e.g. a different route and/or with a reduced acceleration and/or a reduced top speed, etc.); and generating control instructions for controlling the vehicle according to the (determined) driving behavior.

Example 49 is a (e.g., non-transitory) computer-readable medium (e.g., a computer program product, a non-volatile storage medium, a non-transitory storage medium, or a non-volatile storage medium) that stores instructions that, when executed by a processor, cause the processor to control a device to perform a method according to any one of examples 26 to 48.

Example 50 is one or more than one means for carrying out the method according to any one of examples 26 to 48.

In the foregoing description and associated figures, the components of electronic devices are sometimes shown as separate elements, in this respect it is understood that discrete elements may be combined or integrated to form a single element. This includes combining two or more circuits into a single circuit, assembling two or more circuits on a common chip or chassis to form an integrated element, running discrete software components on a common processor core, etc. Conversely, it is understood that a single element may be split into two or more discrete elements, such as splitting a single circuit into two or more separate circuits, splitting a chip or chassis into discrete elements originally provided thereon, splitting a software component into two or more sections and executing them on a separate processor core, etc.

It is understood that implementations of the methods described herein are demonstrative in nature and can therefore be implemented in a corresponding device. Similarly, it is understood that implementations of the apparatus described herein may be implemented as a corresponding method. It will therefore be understood that an apparatus corresponding to a method described herein may have one or more components configured to perform any aspect of the corresponding method.

While the invention has been particularly shown and described with reference to specific embodiments, it is understood that various modifications of the embodiment may be made without departing from the scope of the invention as defined by the appended claims. The scope of the invention is thus determined by the appended claims, and any modifications falling within the meaning and scope of an equivalence of the claims are therefore included.

What is claimed is:

1. A control device for controlling a display unit arranged in a vehicle, the control device comprising a processor configured to:

receive first data representing a surrounding of a vehicle;

determine a driving trajectory of the vehicle using the first data;

receive second sensor data representing a head movement of an occupant of the vehicle;

using a speed of the vehicle, determine a time-dependent relative movement between the head movement of the occupant and a vehicle movement according to the driving trajectory;

determine a time-dependent change in a position of display information, which are to be displayed on a display unit arranged in the vehicle, such that the change in the position of the display information fully or partially compensates for the relative movement; and generate control instructions for controlling the display unit to display the display information according to the time-dependent change of the position.

2. The control device of claim 1, wherein the processor is further configured to:

using the first data, determine a predicted vertical movement of the vehicle, wherein the time-dependent relative movement comprises a time-dependent vertical relative movement between the head movement of the occupant and the predicted vertical movement of the vehicle; and/or using the first data, determine a predicted lateral movement of the vehicle, wherein the time-dependent relative movement comprises a time-dependent lateral relative movement between the head movement of the occupant and the predicted lateral movement of the vehicle.

3. The control device of claim 1, wherein the display unit is mounted in the vehicle; or wherein the display unit is a display unit of a user device worn by an occupant.

4. The control device of claim 1, wherein the display information comprises a text; und wherein the processor is configured to determine the time-dependent change of the position of the text such that that text to be display on the display unit follows the driving trajectory.

5. The control device of claim 4, wherein the processor is further configured to determine the time-dependent change of the position of the text such that text to be display on the display unit is to be read from bottom to top.

6. The control device of claim 4, wherein the first data comprise image data showing an image in driving direction of the vehicle; and wherein the processor is configured to generate the control instructions to display at least a section of the image on the display unit as a background of the text.

7. The control device of claim 4, wherein the processor is further configured to generate a virtual representation of a surrounding of the vehicle in driving direction, wherein the virtual representation shows a street running along the driving trajectory; and generate the control instructions to display the virtual representation as a background of the text.

8. The control device of claim 1, wherein the display information comprises a text;

wherein the second sensor data comprise image data showing at least eyes of the occupant and/or wherein the processor is configured to receive third sensor data owing at least the eyes of the occupant;

wherein the processor is further configured to:

determine a viewing direction of the occupant using the image data;

determine a reading speed of the occupant using the viewing direction of the occupant; and determine the time-dependent change of the position of the display information using the reading speed of the occupant.

9. The control device of claim 1, wherein the control instructions indicate that the display information is to be displayed in a portion of the display unit;

wherein the time-dependent change of the position of the display information is a time-dependent change of the position of the portion.

10. A vehicle comprising the display unit and the control device of claim 1.

11. A method for controlling a display unit arranged in a vehicle, the method comprising:

receiving first data representing a surrounding of a vehicle;

determining a driving trajectory of the vehicle using the first data;

receiving second sensor data representing a head movement of an occupant of the vehicle;

using a speed of the vehicle, determining a time-dependent relative movement between the head movement of the occupant and a vehicle movement according to the driving trajectory;

determining a time-dependent change in a position of display information, which is to be displayed on a display unit arranged in the vehicle, such that the change in the position of the display information fully or partially compensates for the relative movement; and generating control instructions for controlling the display unit to display the display information according to the time-dependent change of the position.

12. The method of claim 11, further comprising;

determining, using the first data, a predicted vertical movement of the vehicle, wherein the time-dependent relative movement comprises a time-dependent vertical relative movement between the head movement of the occupant and the predicted vertical movement of the vehicle; and/or determining, using the first data, a predicted lateral movement of the vehicle, wherein the time-dependent relative movement comprises a time-dependent lateral relative movement between the head movement of the occupant and the predicted lateral movement of the vehicle.

13. The method of claim 11, wherein the display unit is mounted in the vehicle; or wherein the display unit is a display unit of a user device worn by an occupant.

14. The method of claim 11, wherein the display information comprises a text; und further comprising determining the time-dependent change of the position of the text such that that text to be display on the display unit follows the driving trajectory.

15. The method of claim 14, further comprising determining the time-dependent change of the position of the text such that text to be display on the display unit is to be read from bottom to top.

16. The method of claim 14, wherein the first data comprise image data showing an image in driving direction of the vehicle; and further comprising generating the control instructions to display at least a section of the image on the display unit as a background of the text.

17. A non-transitory computer-readable medium storing instructions, which, when executed by a processor, cause the processor to control a device to:

receive first data representing a surrounding of a vehicle;

determine a driving trajectory of the vehicle using the first data;

receive second sensor data representing a head movement of an occupant of the vehicle;

use a speed of the vehicle, determining a time-dependent relative movement between the head movement of the occupant and a vehicle movement according to the driving trajectory;

determine a time-dependent change in a position of display information, which is to be displayed on a display unit arranged in the vehicle, such that the change in the position of the display information fully or partially compensates for the relative movement; and generate control instructions for controlling the display unit to display the display information according to the time-dependent change of the position.

18. The non-transitory computer readable medium of claim 17, wherein the instructions are further configured to cause the processor to:

using the first data, determine a predicted vertical movement of the vehicle, wherein the time-dependent relative movement comprises a time-dependent vertical relative movement between the head movement of the occupant and the predicted vertical movement of the vehicle; and/or using the first data, determine a predicted lateral movement of the vehicle, wherein the time-dependent relative movement comprises a time-dependent lateral relative movement between the head movement of the occupant and the predicted lateral movement of the vehicle.

19. The non-transitory computer readable medium of claim 17, wherein the display unit is mounted in the vehicle; or wherein the display unit is a display unit of a user device worn by an occupant.

20. The non-transitory computer readable medium of claim 17, wherein the display information comprise a text; und wherein the instructions are further configured to cause the processor to determine the time-dependent change of the position of the text such that that text to be display on the display unit follows the driving trajectory.

* * * * *